US012183157B2

(12) United States Patent
Marks et al.

(10) Patent No.: US 12,183,157 B2
(45) **Date of Patent: *Dec. 31, 2024**

(54) SYSTEMS AND METHODS FOR PLAYING A WAGERING GAME IN WHICH SYMBOLS ARE POPULATED FROM ONE OR MORE REELS TO A BINGO CARD

(71) Applicant: ARISTOCRAT TECHNOLOGIES AUSTRALIA PTY LIMITED, North Ryde (AU)

(72) Inventors: Daniel Marks, Decatur, GA (US); Hua Xu, Marietta, GA (US)

(73) Assignee: Aristocrat Technologies Australia Pty Limited, North Ryde (AU)

( * ) Notice: Subject to any disclaimer, the term of this patent is extended or adjusted under 35 U.S.C. 154(b) by 0 days.

This patent is subject to a terminal disclaimer.

(21) Appl. No.: 18/501,790

(22) Filed: Nov. 3, 2023

(65) Prior Publication Data

US 2024/0062625 A1 Feb. 22, 2024

Related U.S. Application Data

(63) Continuation of application No. 17/559,523, filed on Dec. 22, 2021, now Pat. No. 11,847,890, which is a (Continued)

(51) Int. Cl.
*G07F 17/32* (2006.01)

(52) U.S. Cl.
CPC ...... *G07F 17/3258* (2013.01); *G07F 17/3211* (2013.01); *G07F 17/3267* (2013.01); *G07F 17/329* (2013.01)

(58) Field of Classification Search
CPC ............... G07F 17/326; G07F 17/3211; G07F 17/3258; G07F 17/329; G07F 17/34
See application file for complete search history.

(56) References Cited

U.S. PATENT DOCUMENTS 5,393,057 A * 2/1995 Marnell .............. G07F 17/3276 463/19
5,482,289 A * 1/1996 Weingardt ............ A63F 3/0645 273/274

(Continued)

OTHER PUBLICATIONS

Office Action dated Oct. 5, 2020 for U.S. Appl. No. 16/531,904 (pp. 1-18).

(Continued)

*Primary Examiner* — Chase E Leichliter
(74) *Attorney, Agent, or Firm* — Armstrong Teasdale LLP

(57) ABSTRACT

An electronic gaming machine includes a display device, a memory device, and a processor. The processor displays a matrix of symbol positions formed by a plurality of reels. The processor also displays a bingo card. The processor determines an outcome that includes a first plurality of symbols to display in the matrix of symbol positions and evaluates the outcome to determine a win amount. The processor populates the matrix of bingo positions with the first prize symbol to a bingo position of the matrix of bingo positions corresponding to a position of the prize symbol in the matrix of symbol positions. The processor evaluates the matrix of bingo positions to determine whether a predefined winning pattern is formed and, in response, determines an award value based at least in part on numerical values of prize symbols forming the predefined winning pattern in the matrix of bingo positions.

20 Claims, 9 Drawing Sheets

Related U.S. Application Data continuation of application No. 17/526,572, filed on Nov. 15, 2021, now Pat. No. 11,790,728, which is a continuation of application No. 16/531,904, filed on Aug. 5, 2019, now Pat. No. 11,183,018.

(56) References Cited

U.S. PATENT DOCUMENTS

| | | | | |
|---|---|---|---|---|
| 5,647,798 | A * | 7/1997 | Falciglia | G07F 17/34 463/19 |
| 5,935,002 | A * | 8/1999 | Falciglia | G07F 17/34 463/19 |
| 6,398,645 | B1 * | 6/2002 | Yoseloff | G07F 17/3262 463/19 |
| 6,461,241 | B1 * | 10/2002 | Webb | G07F 17/32 463/19 |
| 6,572,472 | B1 * | 6/2003 | Glavich | G07F 17/3267 463/16 |
| 6,609,973 | B1 * | 8/2003 | Weiss | G07F 17/3244 463/19 |
| 6,656,044 | B1 * | 12/2003 | Lewis | G07F 17/3293 463/19 |
| 6,764,398 | B2 * | 7/2004 | Stone | G07F 17/3267 463/19 |
| 6,840,858 | B2 * | 1/2005 | Adams | G07F 17/3244 463/19 |
| 7,291,066 | B2 * | 11/2007 | Gauselmann | G07F 17/32 463/16 |
| 7,575,514 | B2 * | 8/2009 | Cuddy | G07F 17/32 463/19 |
| 7,686,686 | B2 * | 3/2010 | Marks | G07F 17/3267 463/19 |
| 7,853,188 | B2 | 12/2010 | Watanabe | |
| D648,344 | S | 11/2011 | Arnold | |
| 8,128,478 | B2 * | 3/2012 | Meyer | G07F 17/3244 463/19 |
| 8,241,103 | B2 * | 8/2012 | Yarbrough | G07F 17/32 463/19 |
| 8,257,162 | B2 * | 9/2012 | Saito | G07F 17/32 463/20 |
| 8,287,364 | B2 * | 10/2012 | Caputo | A01M 1/023 463/19 |
| 8,425,303 | B2 * | 4/2013 | Kennedy | G07F 17/3267 463/19 |
| 8,647,196 | B1 | 2/2014 | Colvin | |
| D711,401 | S | 8/2014 | Hartley | |
| 9,251,667 | B2 | 2/2016 | Marks | |
| D770,468 | S | 11/2016 | Carlson | |
| D770,469 | S | 11/2016 | Carlson | |
| D772,889 | S | 11/2016 | Carlson | |
| D775,651 | S | 1/2017 | Jin | |
| D787,543 | S | 5/2017 | Qiu | |
| D789,397 | S | 6/2017 | Lee | |
| D800,749 | S | 10/2017 | Jungmann | |
| D839,304 | S | 1/2019 | Penacho | |
| D840,429 | S | 2/2019 | Kroon | |
| 10,269,217 | B2 * | 4/2019 | Nakamura | G07F 17/3213 |
| D848,448 | S | 5/2019 | Carlson | |
| D849,765 | S | 5/2019 | Lee | |
| 10,410,476 | B2 | 9/2019 | Berman | |
| 10,453,306 | B2 | 10/2019 | Crispino | |
| 10,475,287 | B1 * | 11/2019 | Däumling | G07F 17/3211 |
| 10,789,812 | B2 | 9/2020 | Sanborn | |
| D900,127 | S | 10/2020 | Msser | |
| 10,861,287 | B2 * | 12/2020 | Nakamura | G07F 17/34 |
| D918,237 | S | 5/2021 | Lee | |
| D918,241 | S | 5/2021 | Sheridan | |
| D922,409 | S | 6/2021 | Msser | |
| D926,785 | S | 8/2021 | Carlson | |
| 11,183,018 | B2 * | 11/2021 | Marks | G07F 17/3258 |
| D949,167 | S | 4/2022 | Marks | |
| D970,522 | S | 11/2022 | Han | |
| 11,514,757 | B2 | 11/2022 | Casey | |
| D973,696 | S | 12/2022 | Ludwick | |
| 11,605,262 | B2 | 3/2023 | Shiraishi | |
| 11,688,230 | B2 | 6/2023 | Kuhlmann | |
| 11,741,777 | B2 | 8/2023 | Penacho | |
| 11,790,728 | B2 * | 10/2023 | Marks | G07F 17/3211 463/20 |
| 11,847,890 | B2 * | 12/2023 | Marks | G07F 17/3211 |
| 2002/0045472 | A1 * | 4/2002 | Adams | G07F 17/3244 463/19 |
| 2002/0177478 | A1 * | 11/2002 | Glasson | G07F 17/32 463/19 |
| 2004/0152510 | A1 | 8/2004 | Herrmann | |
| 2004/0266509 | A1 * | 12/2004 | Bennett | G07F 17/32 463/16 |
| 2005/0059468 | A1 | 3/2005 | Cannon | |
| 2005/0059471 | A1 | 3/2005 | Cannon | |
| 2005/0064932 | A1 | 3/2005 | Cannon | |
| 2005/0075161 | A1 | 4/2005 | McGlone | |
| 2006/0025199 | A1 | 2/2006 | Harkins | |
| 2006/0084491 | A1 * | 4/2006 | DiCarlo | G07F 17/3288 463/19 |
| 2006/0160603 | A1 * | 7/2006 | Lulek | G07F 17/3276 463/19 |
| 2006/0252493 | A1 * | 11/2006 | Tribout | A63F 3/062 463/19 |
| 2007/0226314 | A1 | 9/2007 | Eick | |
| 2007/0232379 | A1 * | 10/2007 | Falciglia | G07F 17/32 463/19 |
| 2010/0120489 | A1 * | 5/2010 | Meyer | G07F 17/32 463/19 |
| 2010/0203945 | A1 * | 8/2010 | Pitocchelli | A63F 3/0421 463/19 |
| 2010/0205559 | A1 | 8/2010 | Rose | |
| 2011/0028201 | A1 * | 2/2011 | Warner | G07F 17/34 463/19 |
| 2011/0117989 | A1 * | 5/2011 | Kennedy | G07F 17/34 463/20 |
| 2011/0265041 | A1 | 10/2011 | Ganetakos | |
| 2012/0231868 | A1 | 9/2012 | Guinn | |
| 2012/0270631 | A1 * | 10/2012 | Graves | G07F 17/3244 463/19 |
| 2013/0065665 | A1 | 3/2013 | Watkins | |
| 2013/0157741 | A1 * | 6/2013 | Pacey | G07F 17/3265 463/20 |
| 2013/0244747 | A1 * | 9/2013 | Olsen | G07F 17/3267 463/19 |
| 2014/0057702 | A1 * | 2/2014 | Lowell | G07F 17/3244 463/25 |
| 2014/0073402 | A1 | 3/2014 | Colvin | |
| 2014/0364193 | A1 * | 12/2014 | Williamson | G07F 17/326 463/21 |
| 2015/0141114 | A1 * | 5/2015 | Davis | G07F 17/34 463/20 |
| 2015/0248807 | A1 * | 9/2015 | Berman | G07F 17/3267 463/11 |
| 2016/0104344 | A1 * | 4/2016 | Meyer | G07F 17/3258 463/20 |
| 2016/0117884 | A1 * | 4/2016 | Weingardt | G07F 17/3272 463/19 |
| 2016/0307410 | A1 | 10/2016 | Cannon | |
| 2017/0053496 | A1 * | 2/2017 | Borissov | G07F 17/3267 |
| 2017/0092073 | A1 * | 3/2017 | Nakamura | G07F 17/3213 |
| 2018/0151032 | A1 | 5/2018 | Nakamura | |
| 2019/0073859 | A1 | 3/2019 | Penacho | |
| 2019/0180555 | A1 * | 6/2019 | Elias | G07F 17/3211 |
| 2019/0206194 | A1 * | 7/2019 | Nakamura | G07F 17/3211 |
| 2019/0236900 | A1 * | 8/2019 | Pau | G07F 17/3267 |
| 2020/0051390 | A1 * | 2/2020 | Jackson | G06Q 50/34 |
| 2020/0273293 | A1 | 8/2020 | Sanborn | |
| 2020/0294358 | A1 | 9/2020 | Narra | |
| 2021/0043038 | A1 * | 2/2021 | Marks | G07F 17/3258 |
| 2021/0056810 | A1 | 2/2021 | La Guardia | |
| 2021/0097813 | A1 | 4/2021 | Harris | |
| 2021/0183199 | A1 | 6/2021 | Uss | |
| 2021/0248864 | A1 | 8/2021 | Marks | |
| 2022/0012977 | A1 | 1/2022 | Imutan | |
| 2022/0076530 | A1 * | 3/2022 | Marks | G07F 17/3211 |

(56) References Cited

U.S. PATENT DOCUMENTS

| | | | | |
|---|---|---|---|---|
| 2022/0114862 A1* | 4/2022 | Marks | ................. | G07F 17/3267 |
| 2022/0139167 A1 | 5/2022 | Weaver | | |
| 2024/0062625 A1* | 2/2024 | Marks | ................. | G07F 17/3267 |

OTHER PUBLICATIONS

Office Action dated Mar. 30, 2021 for U.S. Appl. No. 16/531,904 (pp. 1-16).
Office Action (Notice of Allowance and Fees Due (PTOL-85)) dated Jul. 26, 2021 for U.S. Appl. No. 16/531,904 (pp. 1-8).
Office Action dated Oct. 1, 2021 for U.S. Appl. No. 29/736,079 (pp. 1-7).
Taylor, Jiny, "Bingo @ DoulbeU Casino" Apr. 25, 2013, posted at youtube.com, [site visited Sep. 27, 2021]. https://www.youtube.com/watch?v=c22qBgdPUF8 (Year: 2013).
Office Action dated Oct. 1, 2021 for U.S. Appl. No. 29/736,080 (pp. 1-7).
Notice of Allowance dated Dec. 9, 2021 for U.S. Appl. No. 29/736,080 (pp. 1-6).
Notice of Allowance dated Dec. 14, 2021 for U.S. Appl. No. 29/736,079 (pp. 1-6).
Office Action (Non-Final Rejection) dated Mar. 2, 2023 for U.S. Appl. No. 17/526,572 (pp. 1-20).
Office Action dated Feb. 6, 2023 for U.S. Appl. No. 29/816,269 (pp. 1-7).
Office Action (Non-Final Rejection) dated Mar. 2, 2023 for U.S. Appl. No. 17/559,523 (pp. 1-15).
Office Action dated Mar. 14, 2023 for U.S. Appl. No. 29/816,274 (pp. 1-7).
"ProPlayer" Aug. 25, 2018, posted at egsol.com, [site visited Mar. 8, 2023]. https://web.archive.org/web/20180825131344/https:// egsol.com/portfolio-items/proplayer (Year: 2018).
"Bingo Bash—HTML5 Game" Nov. 13, 2017, posted at codecanyon.net, [site visited Mar. 8, 2023]. https://web.archive.org/ |web/20171113125403/https://codecanyon.net/item/bingo-bash-html5-game/20828675 (Year: 2017).
"Letters2Friends" Aug. 1, 2013, posted at facebook.com, [site visited Mar. 8, 2023]. https://www.facebook.com/photo/?fbid=610077119036414&set=ecnf.100079467944867 (Year: 2013).
Office Action (Final Rejection) dated Jun. 7, 2023 for U.S. Appl. No. 17/526,572 (pp. 1-12).
Office Action (Notice of Allowance and Fees Due (PTOL-85)) dated Jun. 14, 2023 for U.S. Appl. No. 17/559,523 (pp. 1-10).
Notice of Allowance dated Jun. 14, 2023 for U.S. Appl. No. 29/816,269 (pp. 1-7).
"How to play Bingo on a electronic machine" Feb. 14, 2019, posted at youtube.com, [site visited May 31, 2023]. http (Year: 2019 ).
"Theme Types" Jan. 28, 2017, posted at tmfu-bingo.livejournal.com, [site visited May 31, 2023]. https://tmfu-bingo.livejournal.com /859.html (Year: 2017).
Notice of Allowance dated Jun. 23, 2023 for U.S. Appl. No. 17/708,903 (pp. 1-9).
Notice of Allowance dated Aug. 7, 2023 for U.S. Appl. No. 29/816,274 (pp. 1-7).
Office Action (Notice of Allowance and Fees Due (PTOL-85)) dated Aug. 21, 2023 for U.S. Appl. No. 17/526,572 (pp. 1-9).
Office Action (Notice of Allowance and Fees Due (PTOL-85)) dated Sep. 13, 2023 for U.S. Appl. No. 17/559,523 (pp. 1-10).
Notice of Allowance dated Sep. 13, 2023 for U.S. Appl. No. 17/708,903 (pp. 1-9).
Notice of Allowance dated Oct. 4, 2023 for U.S. Appl. No. 29/816,269 (pp. 1-8).
"Bingo card" Mar. 26, 2017, posted at vba.hmpage.jp, [site visited Sep. 20, 2023]. https://web.archive.org/web/20170326120600/http://vba.hmpage.jp/bingo.htm(Year: 2017).
Office Action (Non-Final Rejection) dated Jul. 10, 2024 for U.S. Appl. No. 18/396,307 (pp. 1-6).

* cited by examiner

SYSTEMS AND METHODS FOR PLAYING A WAGERING GAME IN WHICH SYMBOLS ARE POPULATED FROM ONE OR MORE REELS TO A BINGO CARD

CROSS-REFERENCE TO RELATED APPLICATIONS

This application is a continuation of and claims priority to U.S. patent application Ser. No. 17/559,523, filed Dec. 22, 2021, which is a continuation of U.S. patent application Ser. No. 17/526,572, now U.S. Pat. No. 11,790,728, filed Nov. 15, 2021, which is a continuation of U.S. patent application Ser. No. 16/531,904, now U.S. Pat. No. 11,183,018, filed Aug. 5, 2019, all of which are incorporated herein by reference in their entirety.

TECHNICAL FIELD

The field of disclosure relates generally to electronic gaming, and more particularly, to systems and methods for playing a wagering game, in which one more symbols (such as one or more prize symbols or one or more jackpot symbols) are replicated or populated from one or more reel positions of one or more reels to one or more corresponding bingo positions of a bingo card.

BACKGROUND

Electronic gaming machines (EGMs), or gaming devices, provide a variety of wagering games such as, for example, and without limitation, slot games, video poker games, video blackjack games, roulette games, video bingo games, keno games, and other types of games that are frequently offered at casinos and other locations. Play on EGMs typically involves a player establishing a credit balance by inserting or otherwise submitting money and placing a monetary wager (deducted from the credit balance) on one or more outcomes of an instance, or play, of a primary game, sometimes referred to as a base game. In many games, a player may qualify for secondary games or bonus rounds by attaining a certain winning combination or other triggering event in the base game. Secondary games provide an opportunity to win additional game instances, credits, awards, jackpots, progressives, etc. Awards from any winning outcomes are typically added back to the credit balance and can be provided to the player upon completion of a gaming session or when the player wants to “cash out.”

Slot games are often displayed to the player in the form of various symbols arranged in a row-by-column grid, or “matrix,” which may define a plurality of symbol positions, and which may be generated by spinning a plurality of reels, each of which may correspond to a respective column of the matrix. Specific matching combinations of symbols along predetermined paths, or paylines, drawn through the matrix indicate the outcome of the game. The display typically highlights winning combinations and outcomes for ready identification by the player. Matching combinations and their corresponding awards are usually shown in a “pay-table” that is available to the player for reference. Often, the player may vary his/her wager to included differing numbers of paylines and/or the amount bet on each line. By varying the wager, the player may sometimes alter the frequency or number of winning combinations, the frequency or number of secondary games, and/or the amount awarded.

Typical games use a random number generator (RNG) to randomly determine the outcome of each game. The game is designed to return a certain percentage of the amount wagered back to the player, referred to as return to player (RTP), over the course of many plays or instances of the game. The RTP and randomness of the RNG are fundamental to ensuring the fairness of the games and are therefore highly regulated. The RNG may be used to randomly determine the outcome of a game and symbols may then be selected that correspond to that outcome. Alternatively, the RNG may be used to randomly select the symbols whose resulting combinations determine the outcome. Notably, some games may include an element of skill on the part of the player and are therefore not entirely random.

SUMMARY

In one aspect, an electronic gaming machine is provided. The electronic gaming machine includes a display device, a memory device, and a processor. The processor is configured to execute instructions stored in the memory device. When executed, the instructions cause the processor to at least control the display device to display a matrix of symbol positions formed by a plurality of reels. Each reel of the plurality of reels includes a plurality of symbol positions. The matrix of symbol positions defines a primary play area. The instructions also cause the processor to control the display device to display a bingo card. The bingo card defines a matrix of bingo positions. The instructions further cause the processor to, in response to receipt of an input to play an instance of a game, determine an outcome that includes a first plurality of symbols to display in the matrix of symbol positions. The instructions also cause the processor to evaluate the outcome to determine a win amount. The instructions further cause the processor to, in response to the first plurality of symbols including a first prize symbol displaying a numerical value, populate the matrix of bingo positions with the first prize symbol to a bingo position of the matrix of bingo positions corresponding to a position of the prize symbol in the matrix of symbol positions. The instructions also cause the processor to evaluate the matrix of bingo positions, including the first prize symbol, to determine whether a predefined winning pattern is formed. The instructions further cause the processor to, in response to determining that the predefined winning pattern is formed, determine an award value based at least in part on numerical values of prize symbols forming the predefined winning pattern in the matrix of bingo positions.

In another aspect, a tangible, non-transitory, computer-readable storage medium is provided. The computer-readable storage medium has instructions stored thereon, which when executed by a processor, cause the processor to at least cause the display device to display a matrix of symbol positions formed by a plurality of reels. Each reel of the plurality of reels includes a plurality of symbol positions. The matrix of symbol positions defines a primary play area. The instructions also cause the processor to cause the display device to display a bingo card. The bingo card defines a matrix of bingo positions. The instructions further cause the processor to, in response to receipt of an input to play an instance of a game, determine an outcome that includes a first plurality of symbols to display in the matrix of symbol positions. The instructions also cause the processor to evaluate the outcome to determine a win amount. The instructions further cause the processor to, in response to the first plurality of symbols including a first prize symbol displaying a numerical value, populate the matrix of bingo positions with the first prize symbol to a bingo position of the matrix of bingo positions corresponding to a position of the prize symbol in the matrix of symbol positions. The instructions also cause the processor to evaluate the matrix of bingo positions, including the first prize symbol, to determine whether a predefined winning pattern is formed. The instructions further cause the processor to in response to determining that the predefined winning pattern is formed, determine an award value based at least in part on numerical values of prize symbols forming the predefined winning pattern in the matrix of bingo positions.

In yet another aspect, a computer-implemented method is provided. The method is performed by a gaming device. The gaming device includes at least one processor and a display device. The method includes displaying, on the display device, a matrix of symbol positions formed by a plurality of reels. Each reel of the plurality of reels includes a plurality of symbol positions. The matrix of symbol positions defines a primary play area. The method also includes displaying, on the display device, a bingo card, the bingo card defining a matrix of bingo positions. The method further includes, in response to receipt of an input to play an instance of a game, determining an outcome that includes a first plurality of symbols to display in the matrix of symbol positions. The method also includes evaluating the outcome to determine a win amount. The method further includes in response to the first plurality of symbols including a first prize symbol displaying a numerical value, populating the matrix of bingo positions with the first prize symbol to a bingo position of the matrix of bingo positions corresponding to a position of the prize symbol in the matrix of symbol positions. The method also includes evaluating the matrix of bingo positions, including the first prize symbol, to determine whether a predefined winning pattern is formed. The method further includes in response to determining that the predefined winning pattern is formed, determining an award value based at least in part on numerical values of prize symbols forming the predefined winning pattern in the matrix of bingo positions.

BRIEF DESCRIPTION OF THE DRAWINGS

An example embodiment of the subject matter disclosed will now be described with reference to the accompanying drawings.

DETAILED DESCRIPTION

Systems and methods for playing a wagering game in which symbols (e.g., prize symbols or jackpot symbols) are replicated or populated from symbol positions of one or more reels to corresponding bingo positions of an adjacent bingo card are described. In at least one embodiment, if a prize symbol, such as a symbol including a prize value, is displayed from the plurality of reels after spinning and stopping the plurality of reels, the prize symbol may be replicated or populated from the symbol position on the reels to the corresponding bingo position on the bingo card.

After each spin of the reels, the bingo card may be evaluated to determine whether the prize symbols populated thereon form any predefined winning patterns (e.g., diagonal patterns, straight line patterns, shaped patterns, and the like). If predefined winning patterns are formed on the bingo card from the prize symbols, a secondary game award, such as an aggregate award determined by adding the values of each prize symbol in the pattern, may be provided to a player of the wagering game.

Figure 1:
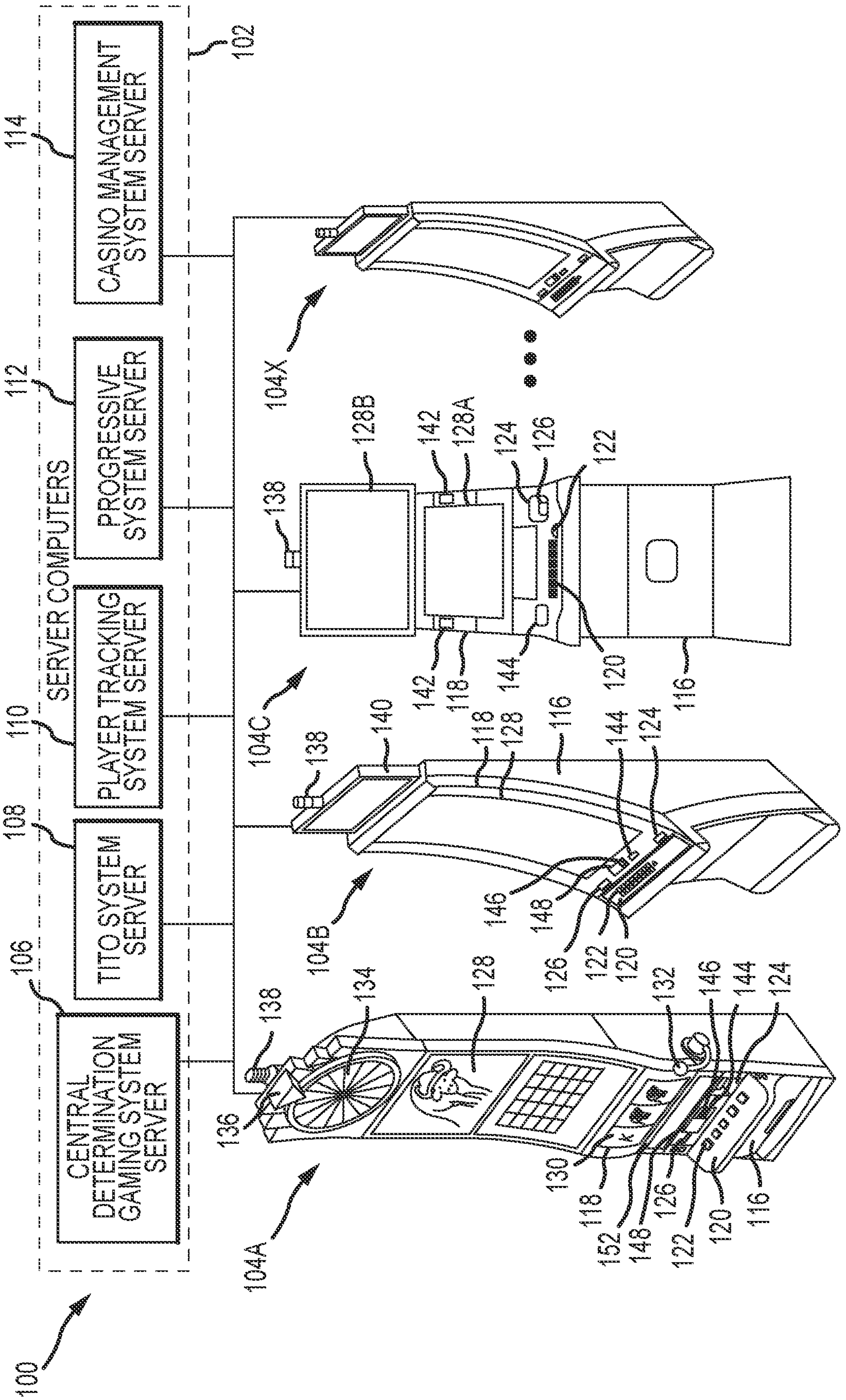
FIG. 1 is an example diagram showing several EGMs networked with various gaming-related servers.

FIG. 1 illustrates several different models of EGMs which may be networked to various gaming related servers. Shown is a system 100 in a gaming environment including one or more server computers 102 (e.g., slot servers of a casino) that are in communication, via a communications network, with one or more gaming devices 104A-104X (EGMs, slots, video poker, bingo machines, etc.) that can implement one or more aspects of the present disclosure. The gaming devices 104A-104X may alternatively be portable and/or remote gaming devices such as, but not limited to, a smart phone, a tablet, a laptop, or a game console, although such devices may require specialized software and/or hardware to comply with regulatory requirements regarding devices used for wagering or games of chance in which monetary awards are provided.

Communication between the gaming devices 104A-104X and the server computers 102, and among the gaming devices 104A-104X, may be direct or indirect, such as over the Internet through a website maintained by a computer on a remote server or over an online data network including commercial online service providers, Internet service providers, private networks, and the like. In other embodiments, the gaming devices 104A-104X may communicate with one another and/or the server computers 102 over RF, cable TV, satellite links and the like.

In some embodiments, server computers 102 may not be necessary and/or preferred. For example, in one or more embodiments, a stand-alone gaming device such as gaming device 104A, gaming device 104B or any of the other gaming devices 104C-104X can implement one or more aspects of the present disclosure. However, it is typical to find multiple EGMs connected to networks implemented with one or more of the different server computers 102 described herein.

The server computers 102 may include a central determination gaming system server 106, a ticket-in-ticket-out (TITO) system server 108, a player tracking system server 110, a progressive system server 112, and/or a casino management system server 114. Gaming devices 104A-104X may include features to enable operation of any or all servers for use by the player and/or operator (e.g., the casino, resort, gaming establishment, tavern, pub, etc.). For example, game outcomes may be generated on a central determination gaming system server 106 and then transmitted over the network to any of a group of remote terminals or remote gaming devices 104A-104X that utilize the game outcomes and display the results to the players.

Gaming device 104A is often of a cabinet construction which may be aligned in rows or banks of similar devices for placement and operation on a casino floor. The gaming device 104A often includes a main door 154 which provides access to the interior of the cabinet. Gaming device 104A typically includes a button area or button deck 120 accessible by a player that is configured with input switches or buttons 122, an access channel for a bill validator 124, and/or an access channel for a ticket-out printer 126.

In FIG. 1, gaming device 104A is shown as a Relm XL™ model gaming device manufactured by Aristocrat® Technologies, Inc. As shown, gaming device 104A is a reel machine having a gaming display area 118 comprising a number (typically 3 or 5) of mechanical reels 130 with various symbols displayed on them. The reels 130 are independently spun and stopped to show a set of symbols within the gaming display area 118 which may be used to determine an outcome to the game.

In many configurations, the gaming machine 104A may have a main display 128 (e.g., video display monitor) mounted to, or above, the gaming display area 118. The main display 128 can be a high-resolution LCD, plasma, LED, or OLED panel which may be flat or curved as shown, a cathode ray tube, or other conventional electronically controlled video monitor.

In some embodiments, the bill validator 124 may also function as a "ticket-in" reader that allows the player to use a casino issued credit ticket to load credits onto the gaming device 104A (e.g., in a cashless ticket ("TITO") system). In such cashless embodiments, the gaming device 104A may also include a "ticket-out" printer 126 for outputting a credit ticket when a "cash out" button is pressed. Cashless TITO systems are well known in the art and are used to generate and track unique bar-codes or other indicators printed on tickets to allow players to avoid the use of bills and coins by loading credits using a ticket reader and cashing out credits using a ticket-out printer 126 on the gaming device 104A. The gaming machine 104A can have hardware meters for purposes including ensuring regulatory compliance and monitoring the player credit balance. In addition, there can be additional meters that record the total amount of money wagered on the gaming machine, total amount of money deposited, total amount of money withdrawn, total amount of winnings on gaming device 104A.

In some embodiments, a player tracking card reader 144, a transceiver for wireless communication with a player's smartphone, a keypad 146, and/or an illuminated display 148 for reading, receiving, entering, and/or displaying player tracking information is provided in EGM 104A. In such embodiments, a game controller within the gaming device 104A can communicate with the player tracking system server 110 to send and receive player tracking information.

Gaming device 104A may also include a bonus topper wheel 134. When bonus play is triggered (e.g., by a player achieving a particular outcome or set of outcomes in the primary game), bonus topper wheel 134 is operative to spin and stop with indicator arrow 136 indicating the outcome of the bonus game. Bonus topper wheel 134 is typically used to play a bonus game, but it could also be incorporated into play of the base or primary game.

A candle 138 may be mounted on the top of gaming device 104A and may be activated by a player (e.g., using a switch or one of buttons 122) to indicate to operations staff that gaming device 104A has experienced a malfunction or the player requires service. The candle 138 is also often used to indicate a jackpot has been won and to alert staff that a hand payout of an award may be needed.

There may also be one or more information panels 152 which may be a back-lit, silkscreened glass panel with lettering to indicate general game information including, for example, a game denomination (e.g., $0.25 or $1), pay lines, pay tables, and/or various game related graphics. In some embodiments, the information panel(s) 152 may be implemented as an additional video display.

Gaming devices 104A have traditionally also included a handle 132 typically mounted to the side of main cabinet 116 which may be used to initiate game play.

Figure 2:
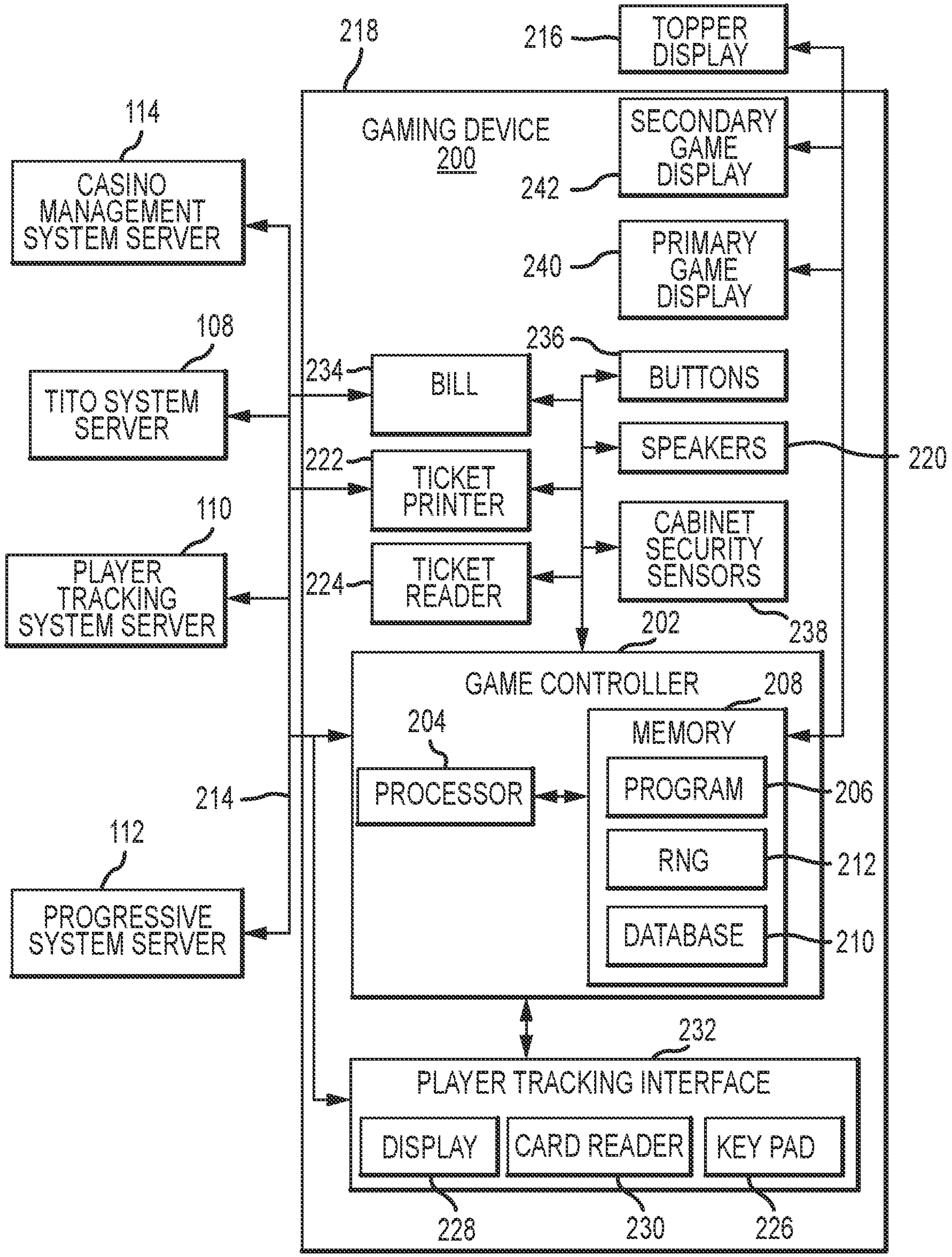
FIG. 2 is a block diagram showing various functional elements of an example EGM.

Many or all the above described components can be controlled by circuitry (e.g., a gaming controller) housed inside the main cabinet 116 of the gaming device 104A, the details of which are shown in FIG. 2.

Note that not all gaming devices suitable for implementing embodiments of the present disclosure necessarily include top wheels, top boxes, information panels, cashless ticket systems, and/or player tracking systems. Further, some suitable gaming devices have only a single game display that includes only a mechanical set of reels and/or a video display, while others are designed for bar counters or table tops and have displays that face upwards.

An alternative example gaming device 104B illustrated in FIG. 1 is the Arc™ model gaming device manufactured by Aristocrat® Technologies, Inc. Note that where possible, reference numerals identifying similar features of the gaming device 104A embodiment are also identified in the gaming device 104B embodiment using the same reference numbers. Gaming device 104B does not include physical reels and instead shows game play functions on main display 128. An optional topper screen 140 may be used as a secondary game display for bonus play, to show game features or attraction activities while a game is not in play, or any other information or media desired by the game designer or operator. In some embodiments, topper screen 140 may also or alternatively be used to display progressive jackpot prizes available to a player during play of gaming device 104B.

Example gaming device 104B includes a main cabinet 116 including a main door 154 which opens to provide access to the interior of the gaming device 104B. The main or service door 154 is typically used by service personnel to refill the ticket-out printer 126 and collect bills and tickets inserted into the bill validator 124. The main or service door 154 may also be accessed to reset the machine, verify and/or upgrade the software, and for general maintenance operations.

Another example gaming device 104C shown is the Helix™ model gaming device manufactured by Aristocrat® Technologies, Inc. Gaming device 104C includes a main display 128A that is in a landscape orientation. Although not illustrated by the front view provided, the landscape display 128A may have a curvature radius from top to bottom, or alternatively from side to side. In some embodiments, display 128A is a flat panel display. Main display 128A is typically used for primary game play while secondary display 128B is typically used for bonus game play, to show game features or attraction activities while the game is not in play or any other information or media desired by the game designer or operator. In some embodiments, example gaming device 104C may also include speakers 142 to output various audio such as game sound, background music, etc.

Many different types of games, including mechanical slot games, video slot games, video poker, video black jack, video pachinko, keno, bingo, and lottery, may be provided with or implemented within the depicted gaming devices 104A-104C and other similar gaming devices. Each gaming device may also be operable to provide many different games. Games may be differentiated according to themes, sounds, graphics, type of game (e.g., slot game vs. card game vs. game with aspects of skill), denomination, number of paylines, maximum jackpot, progressive or non-progressive, bonus games, and may be deployed for operation in Class 2 or Class 3, etc.

FIG. 2 is a block diagram depicting exemplary internal electronic components of a gaming device 200 connected to various external systems. All or parts of the example gaming device 200 shown could be used to implement any one of the example gaming devices 104A-X depicted in FIG. 1. The games available for play on the gaming device 200 are controlled by a game controller 202 that includes one or more processors 204 and a game that may be stored as game software or a program 206 in a memory 208 coupled to the processor 204. The memory 208 may include one or more mass storage devices or media that are housed within gaming device 200. Within the mass storage devices and/or memory 208, one or more databases 210 may be provided for use by the program 206. A random number generator (RNG) 212 that can be implemented in hardware and/or software is typically used to generate random numbers that are used in the operation of game play to ensure that game play outcomes are random and meet regulations for a game of chance.

Alternatively, a game instance (i.e., a play or round of the game) may be generated on a remote gaming device such as a central determination gaming system server 106 (not shown in FIG. 2 but see FIG. 1). The game instance is communicated to gaming device 200 via the network 214 and then displayed on gaming device 200. Gaming device 200 may execute game software, such as but not limited to video streaming software that allows the game to be displayed on gaming device 200. When a game is stored on gaming device 200, it may be loaded from a memory 208 (e.g., from a read only memory (ROM)) or from the central determination gaming system server 106 to memory 208. The memory 208 may include RAM, ROM or another form of storage media that stores instructions for execution by the processor 204. Note that embodiments of the present disclosure represent an improvement in the art of EGM software/progressives and provide new technology in that they facilitate a cross-game or multi-game determination whether a player may be eligible to participate in a progressive award determination and/or whether to award a progressive jackpot. These embodiments are thus not merely new game rules or simply a new display pattern.

The gaming device 200 may include a topper display 216 or another form of a top box (e.g., a topper wheel, a topper screen, etc.) which sits above cabinet 218. The cabinet 218 or topper display 216 may also house a number of other components which may be used to add features to a game being played on gaming device 200, including speakers 220, a ticket printer 222 which prints bar-coded tickets or other media or mechanisms for storing or indicating a player's credit value, a ticket reader 224 which reads bar-coded tickets or other media or mechanisms for storing or indicating a player's credit value, and a player tracking interface 232. The player tracking interface 232 may include a keypad 226 for entering information, a player tracking display 228 for displaying information (e.g., an illuminated or video display), a card reader 230 for receiving data and/or communicating information to and from media or a device such as a smart phone enabling player tracking. Ticket printer 222 may be used to print tickets for a TITO system server 108. The gaming device 200 may further include a bill validator 234, player-input buttons 236 for player input, cabinet security sensors 238 to detect unauthorized opening of the cabinet 218, a primary game display 240, and a secondary game display 242, each coupled to and operable under the control of game controller 202.

Gaming device 200 may be connected over network 214 to player tracking system server 110. Player tracking system server 110 may be, for example, an OASIS® system manufactured by Aristocrat® Technologies, Inc. Player tracking system server 110 is used to track play (e.g., amount wagered, games played, time of play and/or other quantitative or qualitative measures) for individual players so that an operator may reward players in a loyalty program. The player may use the player tracking interface 232 to access his/her account information, activate free play, and/or request various information. Player tracking or loyalty programs seek to reward players for their play and help build brand loyalty to the gaming establishment. The rewards typically correspond to the player's level of patronage (e.g., to the player's playing frequency and/or total amount of game plays at a given casino). Player tracking rewards may be complimentary and/or discounted meals, lodging, entertainment and/or additional play. Player tracking information may be combined with other information that is now readily obtainable by a casino management system.

Gaming devices, such as gaming devices 104A-104X, 200, are highly regulated to ensure fairness and, in many cases, gaming devices 104A-104X, 200 are operable to award monetary awards (e.g., typically dispensed in the form of a redeemable voucher). Therefore, to satisfy security and regulatory requirements in a gaming environment, hardware and software architectures are implemented in gaming devices 104A-104X, 200 that differ significantly from those of general-purpose computers. Adapting general purpose computers to function as gaming devices 200 is not simple or straightforward because of: 1) the regulatory requirements for gaming devices 200, 2) the harsh environment in which gaming devices 200 operate, 3) security requirements, 4) fault tolerance requirements, and 5) the requirement for additional special purpose componentry enabling functionality of an EGM. These differences require substantial engineering effort with respect to game design implementation, hardware components and software.

When a player wishes to play the gaming device 200, he/she can insert cash or a ticket voucher through a coin acceptor (not shown) or bill validator 234 to establish a credit balance on the gamine machine. The credit balance is used by the player to place wagers on instances of the game and to receive credit awards based on the outcome of winning instances. The credit balance is decreased by the amount of each wager and increased upon a win. The player can add additional credits to the balance at any time. The player may also optionally insert a loyalty club card into the card reader 230. During the game, the player views the game outcome on one or more of the primary game display 240 and secondary game display 242. Other game and prize information may also be displayed.

For each game instance, a player may make selections, which may affect play of the game. For example, the player may vary the total amount wagered by selecting the amount bet per line and the number of lines played. In many games, the player is asked to initiate or select options during course of game play (such as spinning a wheel to begin a bonus round or select various items during a feature game). The player may make these selections using the player-input buttons 236, the primary game display 240 which may be a touch screen, or using some other device which enables a player to input information into the gaming device 200.

During certain game events, the gaming device 200 may display visual and auditory effects that can be perceived by the player. These effects add to the excitement of a game, which makes a player more likely to enjoy the playing experience. Auditory effects include various sounds that are projected by the speakers 220. Visual effects include flashing lights, strobing lights or other patterns displayed from lights on the gaming device 200 or from lights behind the information panel 152 (FIG. 1).

When the player is done, he/she cashes out the credit balance (typically by pressing a cash out button to receive a ticket from the ticket printer 222). The ticket may be "cashed-in" for money or inserted into another machine to establish a credit balance for play.

Figure 3:
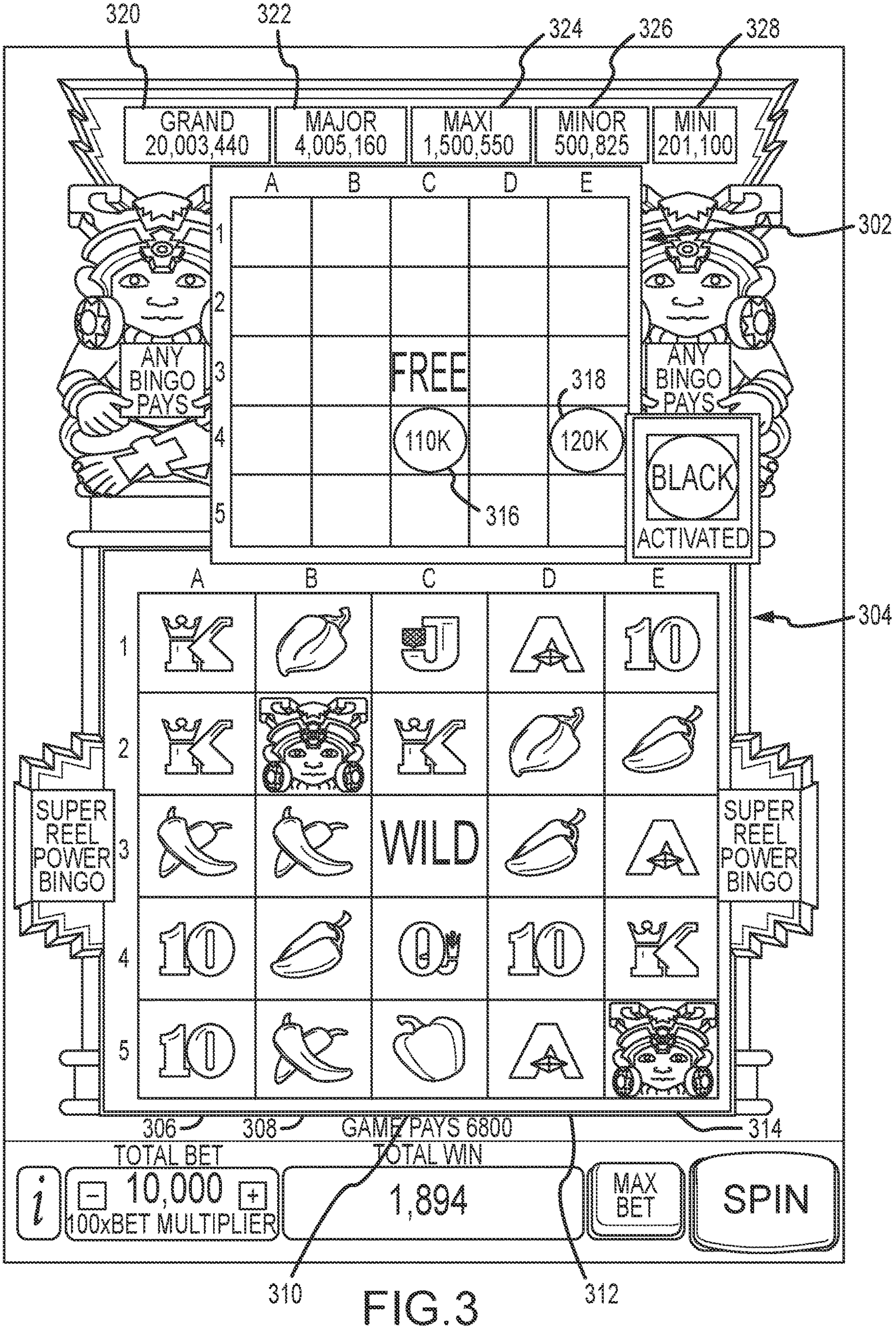
FIG. 3 is a screenshot of an example wagering game, in which a bingo card is displayed in conjunction with a reel window for a plurality of reels.

FIG. 3 is a screenshot of a wagering game 300, in which a bingo card 302 is displayed in conjunction with a reel window for a plurality of reels 304. In the example embodiment, the reel window (not separately numbered) includes a first reel 306, a second reel 308, a third reel 310, a fourth reel 312, and a fifth reel 314, collectively referred to herein as "reels 304," only portions of which are shown here. However, any suitable number of reels 304, such as one reel to reels numbering greater than five reels, may be implemented on a variety of embodiments. Wagering game 300 also visually includes a bingo card 302, although, as described in detail below, in the example embodiment, no bingo number listing or "ball call" may be provided. Rather, bingo card 302 may be modified based upon one or more outcomes appearing on reels 304. Stated another way, bingo card 302 may not be matched or "daubed" based upon a random bingo number listing or ball call, but played in conjunction with and modified based upon one or more reel outcomes appearing on reels 304.

In various embodiments, wagering game 300 may be displayed by and played one or more EGMs 104A-104X (as shown in FIG. 1 and FIG. 2). In other embodiments, wagering game 300 may be played on any other suitable computing device, such as a personal computer, a tablet computing device, a mobile communications device (e.g., a smartphone), and the like. Thus, it will be appreciated that wagering game 300 may be provided in either of a so-called "thick client" or "thin client" version. Although not central to an understanding of the present disclosure, in a thick client embodiment, all or at least a portion of wagering game 300 may be stored on a memory device 210 of an EGM 104A-104X. In contrast, in a thin client embodiment, all or at least a portion of wagering game 300 may be served from a backend server system, such as any of servers 106-114.

Reels 304 may include simulated or "virtual" reels generated and displayed by one or more processors 204 (such as processors of game controller 202) on any game display, such as primary game display 240, secondary game display 242, topper display 216, player tracking interface display 228, and/or any other suitable display device. In other embodiments, reels 304 may include one or more physical or mechanical reels having a display element, such as a liquid crystal display (LCD), capable of displaying one or more symbols during gameplay. In other embodiments, reels 304 may include a plurality of mechanical reels overlaid by an LCD panel.

Each reel 306-314 may include a plurality of symbol positions, which may, together, define a matrix of symbol positions. Each symbol position may be designated by a row number (e.g., "1," "2," "3," "4," "5," etc.) and a column letter (e.g., "A," "B," "C," "D," "E," etc.) For example, the upper-left-most symbol position, occurring on reel 306 at the intersection of row 1 and column A, may be designated by the symbol position "1A." In the example embodiment, the matrix of symbol positions is a 5×5 matrix formed from five symbol positions from each of five reels 304. In other embodiments, the matrix of symbol positions may be of other dimensions (e.g., 4×4, 3×3, 4×5, 5×4, or such). In still other embodiments, the matrix of symbol positions may be non-rectangular (e.g., column heights of 3, 5, 5, 5, 3 on five reels).

Each symbol position of each reel 306-314 may also include a symbol. In the exemplary embodiment, some of the symbols of one or more reels 306-314 are "prize" symbols (indicating a prize, such as a cash or credit prize), and some of the symbols of each reel 306-314 are non-prize or "standard" symbols. As used herein, a "standard" symbol may refer to any symbol that is not a prize symbol, where again, a "prize" symbol may include any symbol displaying a cash or credit prize. As used herein, a "wild" symbol may refer to any symbol capable of substituting, e.g. on a line win or ways to win, for another symbol, including some or all standard symbols and/or value symbols. In some embodiments, one or more "jackpot" symbols may appear and may be used to identify jackpot wins in certain situations described in further detail below.

During a round of gameplay (e.g., after a wager is submitted), each reel 306-314 may be spun and stopped to display a subset of the symbols of each reel 306-314. For example, in at least some embodiments, five symbol positions of each reel 306-314 may be selected and stopped by processor 204 to display five symbols, one in each selected and stopped symbol position, for presentation to a player.

In at least some embodiments, one or more consecutive symbols are selected from each reel 306-314 for presentation. For example, if a symbol at symbol position "1A" is selected by processor 204 for presentation, the symbols at symbol positions "2A" and "3A" may also be selected and displayed.

In addition, in some embodiments, one or more symbol display positions of one or more reels 306-314 may be spun and stopped independently and/or one at a time (or in groups at a time). For example, if one symbol position is spun and stopped at a time, and there are twenty-five symbol positions across all five reels 306-314, twenty-five spins of twenty-five symbol positions may be performed.

Thus, a plurality of symbols from each of reels 306-314 may be displayed for presentation to a player of wagering game 300. As described above, these symbols may include standard symbols as well as prize symbols.

Bingo card 302 may include a plurality of bingo positions, which may, together, define a matrix of bingo positions. Each bingo position may be designated by a row number (e.g., "1," "2," "3," "4," "5," etc.) and a column letter (e.g., "A," "B," "C," "D," "E," etc.) For example, the upper-left-most bingo position, occurring at the intersection of row 1 and column A, may be designated by the bingo position "1A."

As a result, in the example embodiment, bingo card 302 may include a number of bingo positions equal to a number of symbol positions defined by reels 306-314. For example, if there are twenty-five symbol positions on reels 306-314, bingo card 302 may likewise include twenty-five bingo positions. A one-to-one relationship may, in addition, be defined between each symbol position of reels 306-314 and each bingo position of bingo card 302. In one example, a one-to-one relationship may be defined between symbol position “1A” and bingo position “1A,” whereby, as described herein, symbol position “1A” corresponds to bingo position “1A.” The remaining bingo positions may similarly correspond to a respective symbol position of reels 306-314.

In other embodiments, there may be greater or fewer bingo positions than there are symbol positions. In such embodiments, a different reel position to bingo position correspondence may be defined. For example, if there are greater bingo positions than symbol positions, a one-to-many correspondence may be established, whereby a single symbol position may correspond to more than a single bingo position. Conversely, if there are fewer bingo positions than symbol positions, a many-to-one correspondence may be established, whereby a plurality of symbol positions correspond to a single bingo position. These arrangements are merely illustrative, however. It will be appreciated that a variety of other suitable symbol position to bingo position relationships may be established or defined.

In operation, one or more prize symbols appearing on reels 306-314 may be replicated or populated from a position in the matrix of reel positions to a corresponding bingo position in the matrix of bingo positions of bingo card 302 to populate the corresponding bingo position with the prize symbol from the corresponding symbol position. For example, if symbol position “1A” displays a prize symbol after being spun and stopped, the prize symbol may be replicated in bingo position “1A” of bingo card 302 to populate bingo position “1A” with the same prize symbol.

In some embodiments, and as shown with continuing reference to FIG. 3, one or more prize symbols, such as prize symbols 316 and 318 may be pre-populated on bingo card 302 prior to reels 306-314 being spun and stopped. Pre-population of one or more prize symbols on bingo card 302 may be performed to provide a head start to a player of wagering game 300. For example, this may be performed when the player begins a play session, such as when a player deposits a credit balance and makes a first wager. In certain embodiments, pre-population of prize symbols may be randomly activated (e.g., during game play, between spins, after completion of a bonus game, after one or a predetermined quantity of bingo patterns are completed, including but not limited to a specific pattern or any pattern that is in a set of predetermined patterns). Further, at least some bingo positions may be unpopulated (or “vacant”) prior to game play (e.g., prior to a gaming session, prior to a particular spin). As described herein, these vacant positions may be populated with prize symbols appearing in symbol positions of reels 306-314. In some embodiments, prize symbols on bingo card 302 persist from one play of the wagering game to the next until one or more bingo patterns are achieved. In some embodiments, prize symbols on bingo card 302 are removed after play of each wagering game (e.g., regardless of whether a bingo pattern is formed). In some embodiments, prize symbols persist until either one or more bingo patterns is formed or until a player ends a play session (e.g., by selecting a cash out option).

In the example embodiment, a plurality of jackpots may be displayed across a top edge (or in any other location) of wagering game 300. For example, a first jackpot 320, a second jackpot 322, a third jackpot 324, a fourth jackpot 326, and a fifth jackpot 328 may be provided and displayed. Jackpots 320-328 may, in various embodiments, include progressive jackpots, which it will be appreciated, may be incremented each time a player places a wager may a predefined increment or amount, and which may, as a result, slowly increase towards one or more maximum values. Although five jackpots 320-328 are shown, any other suitable number of jackpots may be included in wagering game 300. Jackpots 320-328 may be awarded as described below.

Figure 4:
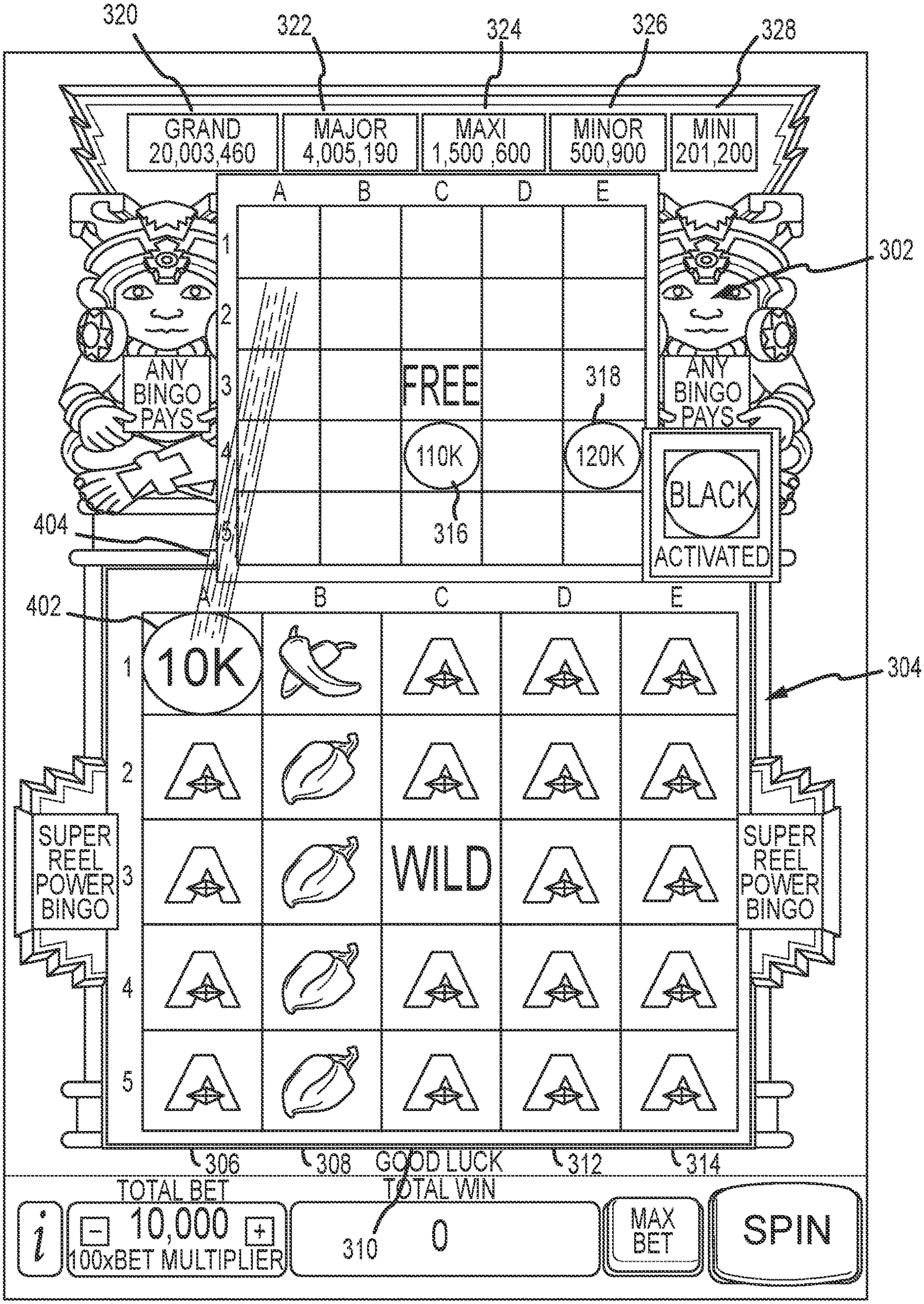
FIG. 4 is a screenshot of the example wagering game of FIG. 3, in which a bingo card is displayed in conjunction with a plurality of reels after an initial spin of the plurality of reels.

FIG. 4 is a screenshot of the example wagering game 300, in which bingo card 302 is displayed in conjunction with reels 306-314, after an initial spin of reels 306-314. As shown, after an initial spin, such as in response to a player selecting the max bet button and/or spin button (i.e., a player input button 236), reels 306-314 may be stopped, and one or more prize symbols may appear as a result. In the example of FIG. 4, a prize symbol 402 having a value of “10K” appears at symbol position “1A.”

Further, the symbols appearing on reels 306-314 may be evaluated for one or more winning symbol combinations (e.g., against a paytable of winning symbol combinations), as those of skill in the art will generally appreciate. If a winning symbol combination appears on reels 306-314, a first or “primary” game award may be provided to the player. As described in additional detail herein, a “secondary” game award may be provided in addition to or apart from the primary game award based upon an evaluation of bingo card 302.

As a result of the appearance of prize symbol 402 at symbol position “1A,” prize symbol 402 may be replicated, translated or transferred, or otherwise populated and displayed at bingo position “1A” of bingo card 302. In the example embodiment, an animation or graphic, such as a ray or beam 404 of light may shine from symbol position “1A” to bingo position “1A” during replication or population of prize symbol 402 to provide a visual cue to a player that prize symbol 402 is being replicated or populated from reels 306-314 to bingo card 302.

Figure 5:
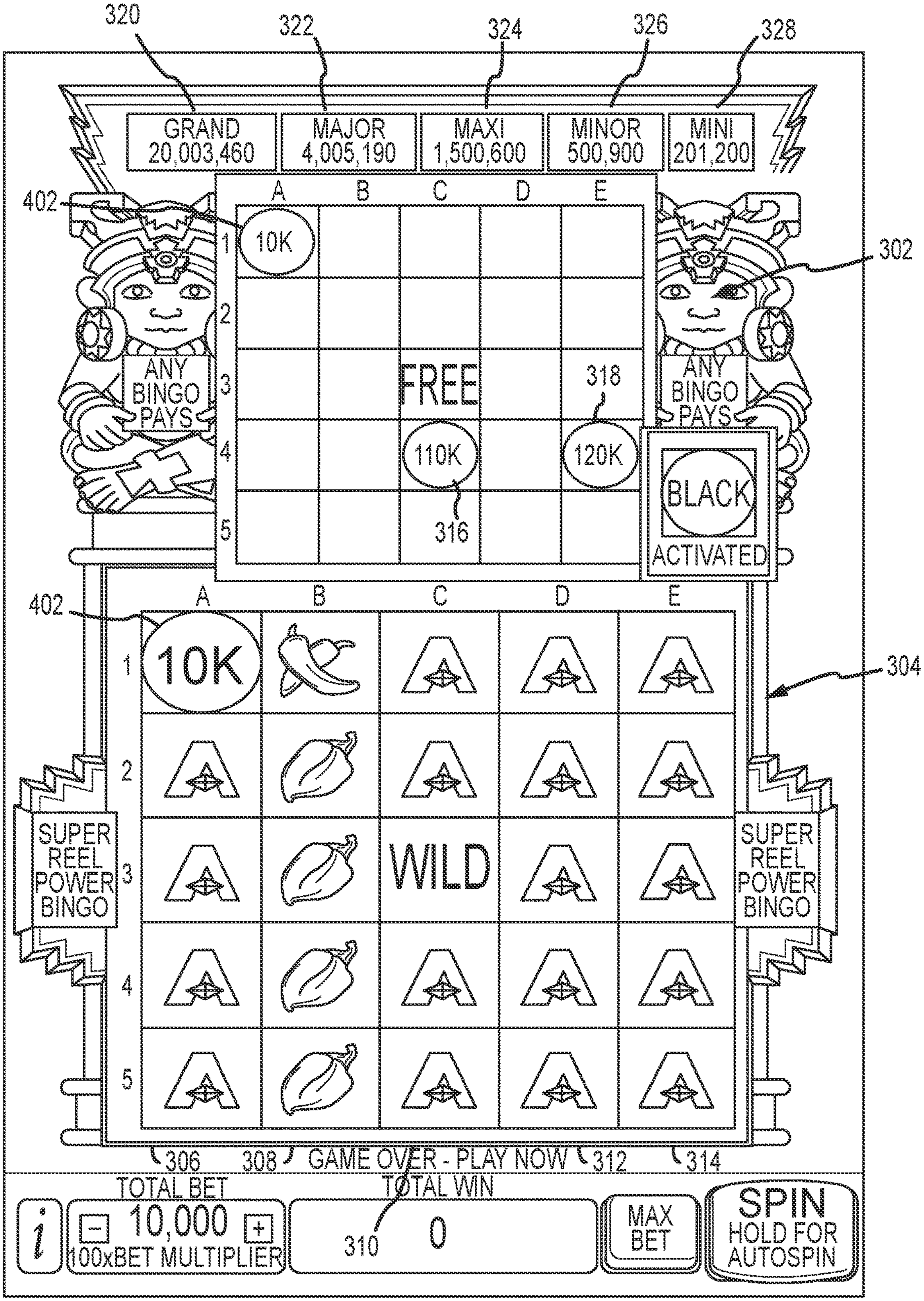
FIG. 5 is a screenshot of the example wagering game of FIG. 3, in which a prize symbol is replicated or populated from a first symbol position of the plurality of reels to a corresponding bingo position of a bingo card.

FIG. 5 is a screenshot of the example wagering game 300, in which replication of prize symbol 402 from symbol position “1A” of reels 306-314 to bingo position “1A” of bingo card 302 is completed. Although prize symbols are, in some places, described herein as being replicated from symbol positions to bingo positions, it will be appreciated that other graphics may also be used to indicate transference of a prize symbol from reels 306-314 to bingo card 302. As described, it will also be appreciated that symbols (e.g., prize symbols as well as other symbols, such as jackpot symbols) may sometimes be replicated, but that other copying or population functions may also be employed, all of which are within the scope of the present disclosure.

For example, in at least one embodiment, a prize symbol may appear to fly off of or otherwise transfer from a symbol position of reels 306-314 and over to a bingo position of bingo card 302, whereupon the prize symbol may be removed from the symbol position, leaving, for example, a vacant symbol position or exposing a symbol underneath the prize symbol on the vacated symbol position. In another embodiment, symbols displayed on bingo card 302 may be replicated or transferred back to reels 306-314, exposing symbols thereunder and/or leaving vacated bingo positions as a result.

In one example, a player may achieve a predefined pattern or cluster of symbols on bingo card 302, which may trigger replication or placement of one or more symbols in the pattern or cluster of symbol positions of reels 306-314. For instance, a cluster of four wild symbols on bingo card 302 may trigger placement of four (or more) wild symbols on reels 306-314, such as randomly in one or more (scattered) symbol positions, which may increase a player's chances of winning an award based upon the symbol evaluation of reels 306-314. Thus, in at least some embodiments, symbols may not simply transfer up from reels 306-314 to bingo card 302, but down from bingo card 302 to reels 306-314.

Gameplay may continue in the fashion described above for one or more spins of reels 306-314 until a player terminates wagering game 300 and/or achieves a predefined winning pattern on bingo card 302. More particularly, a player may select the "Spin" or "Max Bet" buttons to place repeated wagers and to cause reels 306-314 to be re-spun any number of times. Each time reels 306-314 are re-spun, the combination of symbols appearing on reels 306-314 may be evaluated for one or more winning combinations of symbols, and any prize symbols appearing on reels 306-314 as a result of a spin may be replicated to a corresponding bingo position of bingo card 302.

The prize symbols populated onto bingo card 302 during one or more reel spins may thus remain on bingo card 302 for the duration of multiple spins of reels 306-314. This is to permit accumulation of a plurality of prize symbols on bingo card 302, whereby, if a predefined winning pattern is formed by the prize symbols accumulated on bingo card 302, a player may be provided a game award, as described in additional detail below. In some embodiments, when a new prize symbol is populated onto an already-populated bingo position of bingo card 302, the new prize may be added to or multiplied by the current prize appearing in that bingo position. In some embodiments, the new prize symbol may replace the already-populated prize symbol at that bingo position. In some of these embodiments, the replacement may be based on a comparison of the value of the new prize symbol and the value of the already populated prize symbol (only if the prize symbol is greater, lesser, etc.) In one or more of these embodiments, the replacement or addition/multiplication may only occur for a predetermined quantity of instances, after which the symbol is "locked" and cannot be added to/replaced.

In addition to accumulating prize symbols on a single bingo card 302, in at least some embodiments, a plurality of different bingo cards may be provided to and stored in association with a player, such as based upon a wager amount or wager level. For example, a first bingo card 302 may be stored for a player and displayed when the player places wagers of a first amount or level (e.g., a minimum bet). Likewise, one or more additional or intermediate bingo cards may be stored for a player and displayed when the player places wagers of intermediate amounts or levels (e.g., bets greater than a minimum bet and less than a maximum bet). In addition, a maximum bet bingo card may be stored for a player and displayed when the player places wagers associated with a maximum bet. In addition, and in some embodiments, one or more wager levels may share a bingo card. For example, a first group of wager levels may share a first bingo card, a second group of wager levels may share a second bingo card, and so on.

It will be appreciated that during gameplay, a player may wish to change his or her wager level one or more times (e.g., to accommodate a fluctuating credit balance, etc). In the example embodiment, a bingo card corresponding to the player's current wager level may be displayed for the player in association with reels 306-314. Moreover, if the player has previously placed wagers at the current wager level and one or more prize symbols have accumulated on the corresponding bingo card, the accumulated prized values may be retained or otherwise persist for any suitable duration on the associated bingo card.

In one embodiment, prize symbols accumulated on a bingo card may persist over a single gaming session (e.g., until a player terminates gameplay) and/or over multiple gaming sessions. If a bingo card that includes accumulated prize symbols persists over multiple gaming sessions, the bingo card or data sufficient to recreate the bingo card may be stored to a backend system, such as bingo server 107, for retrieval during one or more subsequent gaming sessions.

Thus, as a player switches between wager levels, the bingo card displayed for the player may also be switched, and the prize symbols accumulated thereon during one or more previous spins of reels 306-314 may retained and displayed for the player, even as the player returns from a different wager level associated with a different bingo card to bingo card associated with the current wager level.

One specific improvement to the technical field of wagering games that is accomplished by permitting players to retain prize symbols on one or more bingo cards as players changes wager levels is that players may be encouraged to try different wager levels and/or to place larger wagers in intermittent or excited bursts. In addition, players may be more generally encouraged to continue gameplay and/or, in the case of a multi-session game at least, to resume gameplay after taking a break. Players may perceive a variety of advantages as well, such as, for example, the ability to retain bingo cards that have been "worked for," where a change in wager level or the necessity of taking a break might discourage a player from returning to wagering game 300 if bingo card persistence features were not provided.

Figure 6:
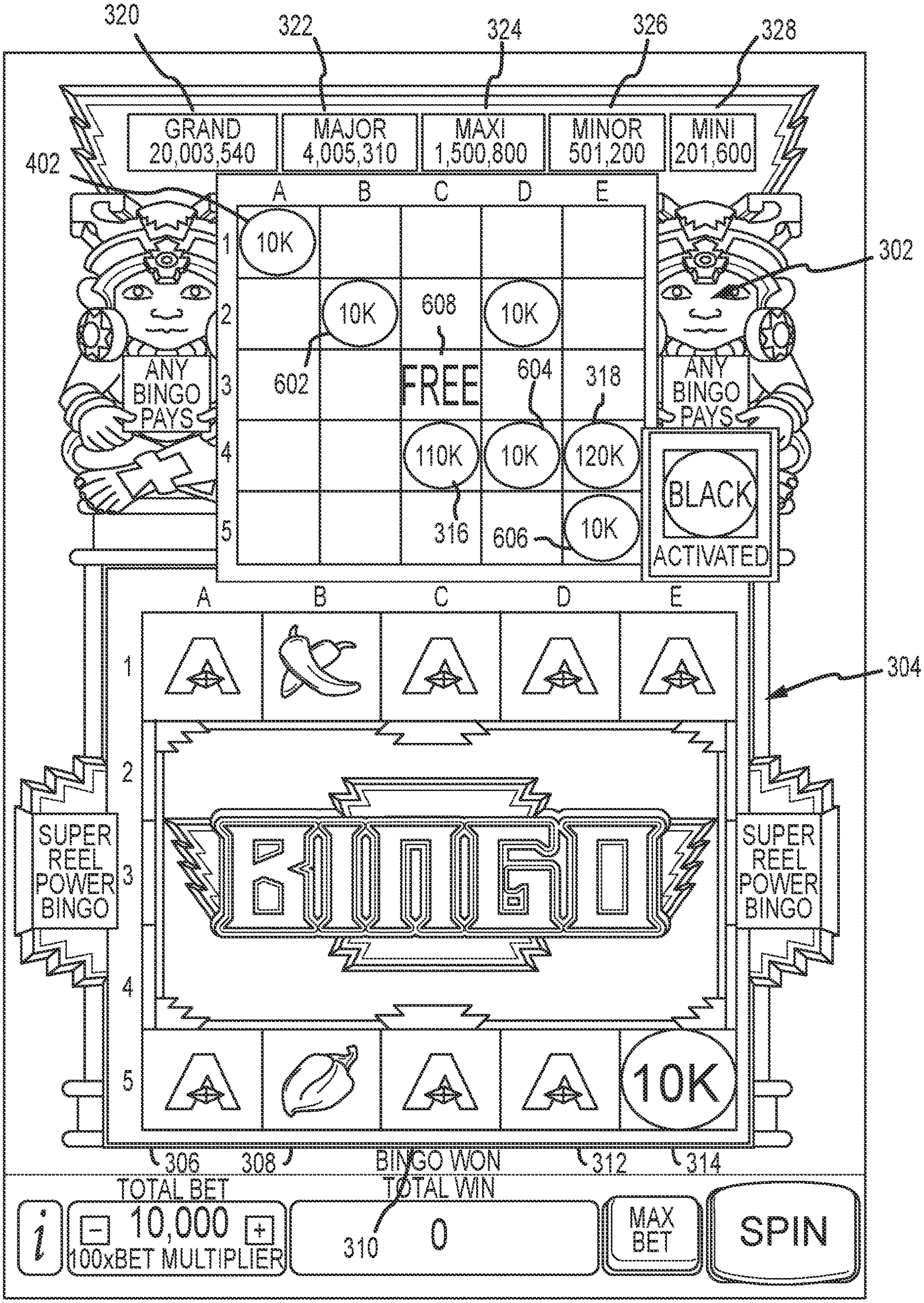
FIG. 6 is a screenshot of the example wagering game of FIG. 3, in which a plurality of prize symbols have accumulated, over the course of gameplay, on the bingo card.

FIG. 6 is a screenshot of the example wagering game 300, in which gameplay has progressed, as described above, and in which a plurality of prize symbols have accumulated, over the course of gameplay, on bingo card 302. Specifically, as shown, first prize symbol 402 persists from the initial spin of reels 306-314, and a second prize symbol 602, a third prize symbol 604, and a fourth prize symbol 606 have been replicated or populated from one or more subsequent spins of reels 306-314.

In the example shown at FIG. 6, first prize symbol 402, second prize symbol 602, third prize symbol 604, and fourth prize symbol 606 are arranged in line on a diagonal of bingo card 302. However, it will be appreciated that prize symbols 402-606 may have been populated, as described herein, at any bingo position of bingo card 302, depending upon a symbol position of reels 306-314 where each prize symbol 402-606 originally landed or occurred.

Each time a prize symbol 402-606 is populated on bingo card 302, an evaluation of bingo card 302 may be performed to determine whether any predefined winning pattern is formed on bingo card 302. In various embodiments, any suitable pattern may be predefined as a winning pattern. For example, in at least some embodiments, any diagonal pattern may correspond to a winning pattern.

One specific improvement to the technical field of wagering games that is accomplished by the pattern completion features of wagering game 300 is that players may be encouraged to continue playing wagering game 300 until a winning pattern is achieved on bingo card 302. Specifically, players may perceive a certain "equity" in wagering game 300, in that players are invested, both in terms of time and multiple wagers, in achieving a partially completed winning pattern on bingo card 302.

In addition, one or more bingo positions, such as a center bingo position 608, may be designated as "FREE" bingo positions. FREE bingo positions may be used to indicate that a predefined winning pattern may be completed or achieved in conjunction with the FREE bingo position without the necessity of populating a prize symbol into the FREE bingo position. Thus, in the example of FIG. 6, prize symbols 402, 602, 604, 606, and FREE bingo position 608 are situated on bingo card 302 to complete a left-to-right diagonal pattern, which may be predefined as a winning pattern, and which may result in the player being provided a game award.

More particularly, in response to completion of a predefined winning pattern (i.e., the left-to-right diagonal pattern in this example), a game award (or "secondary" game award, as described more briefly above) may be calculated and provided to the player. In at least one embodiment, a secondary game award may be calculated by aggregating a prize value of each prize symbol forming the winning pattern. For instance, the prize values of each prize symbol 402 (10K), 602 (10K), 604 (10K), and 606 (10K) may be aggregated to calculate a total secondary game award, which may, in this example, come to 40K credits. In other embodiments, one or more additional features may be added to the secondary game award calculation, such as, for example, to add player excitement to wagering game 300.

Figure 7:
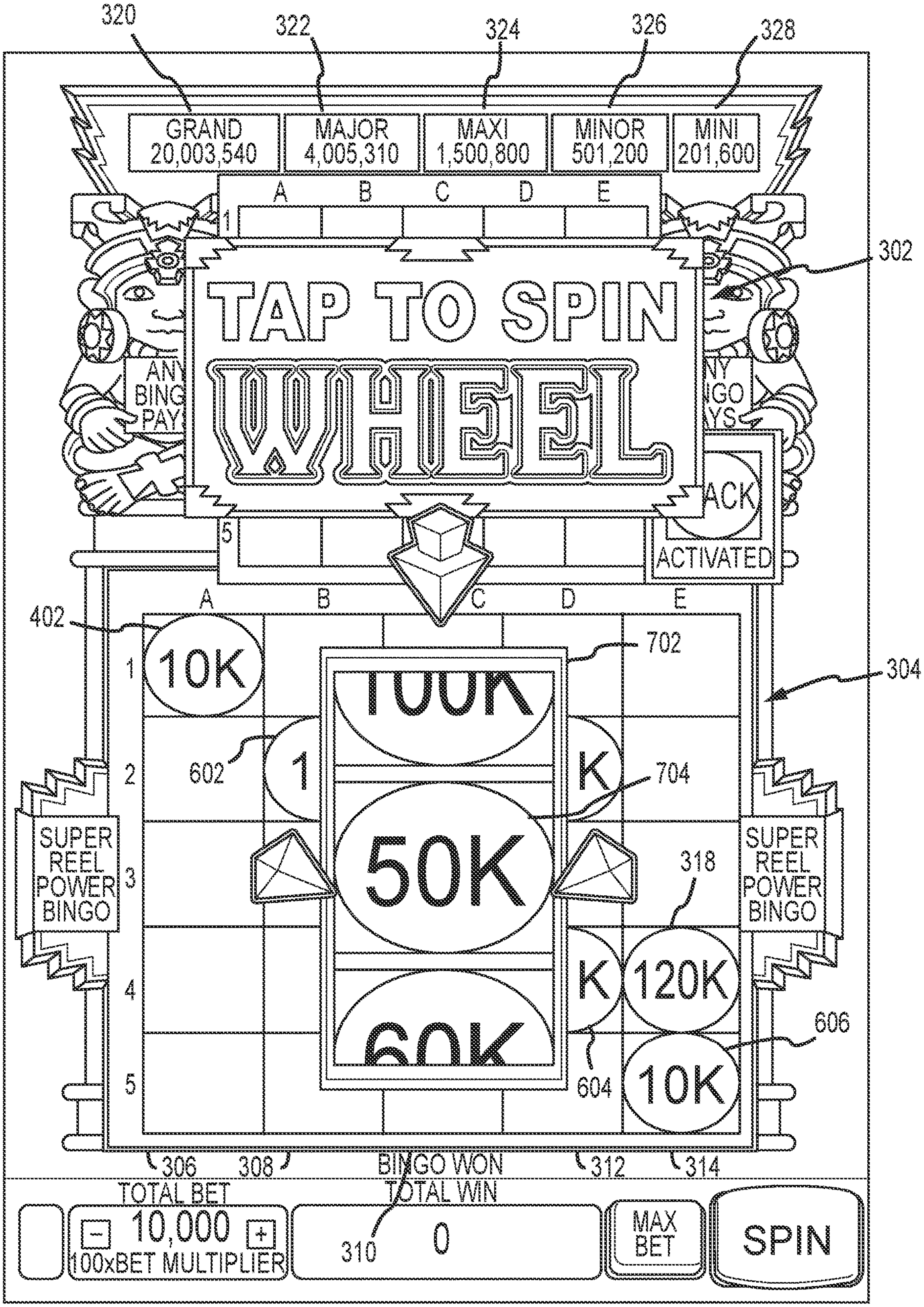
FIG. 7 is a screenshot of the example wagering game of FIG. 3, illustrating a secondary game award calculation.

FIG. 7 is a screenshot of the example wagering game 300, in which one such additional feature is added to the secondary game award calculation. Specifically, as shown, bingo card 302 may be transposed over reels 306-314 and an enlarged center reel 702 added where the FREE bingo position 608 would typically reside. Enlarged center reel 702 may be spun and stopped, and a prize symbol having an associated prize value randomly selected and shown. In the example of FIG. 7, an additional prize symbol 704 having a value of 50K is selected and displayed on stopped enlarged center reel 702. The value (50K) of additional prize symbol 704 is used to calculate an aggregated secondary game award, as described above, except in this embodiment, the value (50K) of the additional prize symbol 704 is also added to the secondary game award. Accordingly, in this case, the aggregated secondary game award may increase from 40K credits (as in the previous example) to 90K credits (40K+50K). In some embodiments, the FREE bingo position 608 may include a multiplier award (e.g., a multiplier that may be applied to the aggregated secondary game award). In some embodiments, the FREE bingo position 608 may award an event such as "immediately winning all the prizes on the bingo board (regardless of winning bingo patterns)."

Another additional feature that may be added to a secondary game award calculation may be a random boost feature, which may be triggered randomly and/or based upon the occurrence of one or more symbols or combinations of symbols, and which may cause a value of one or more prize symbols to be multiplied or "boosted" to an increased or greater prize value.

Figure 8:
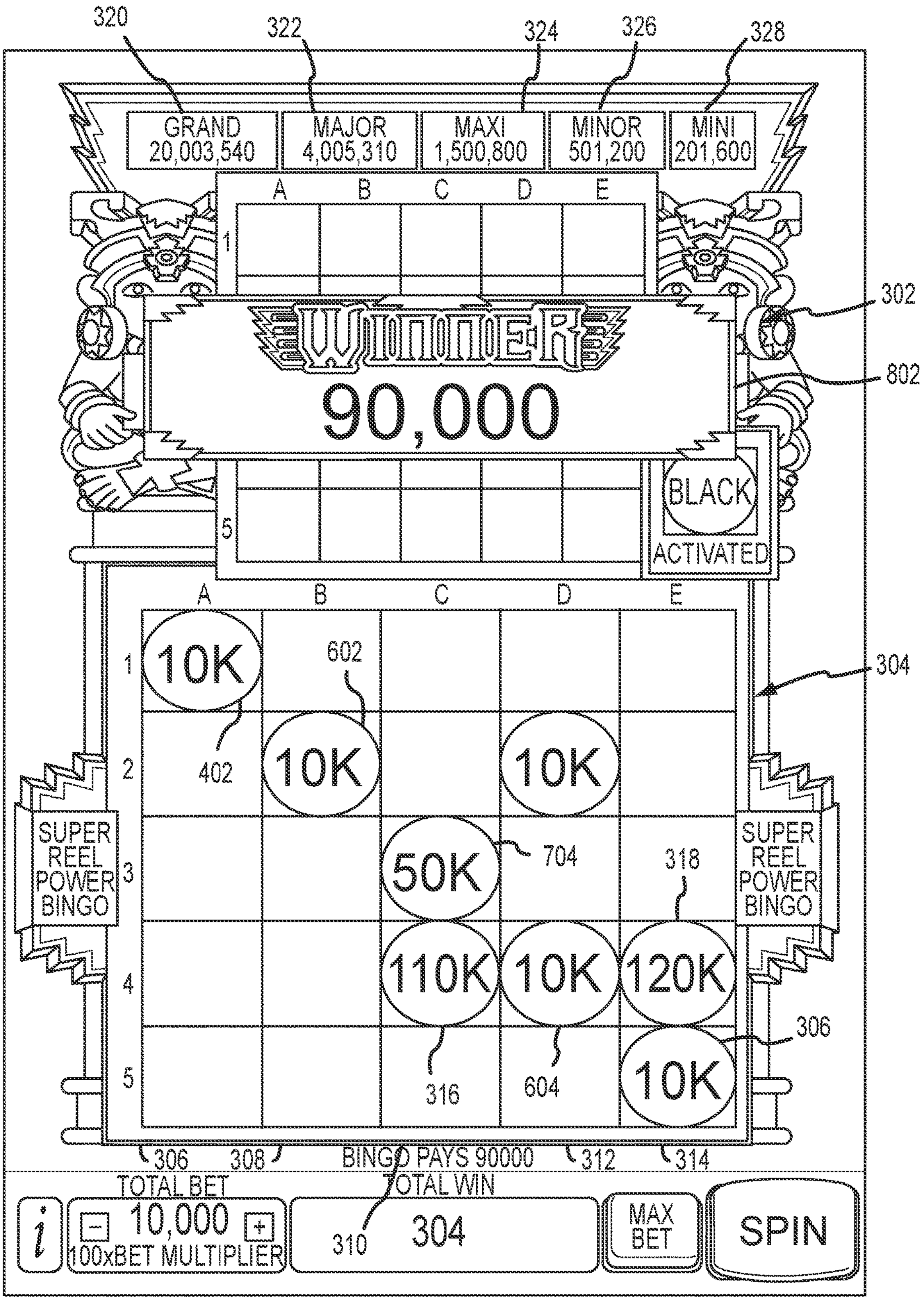
FIG. 8 is a screenshot of the example wagering game of FIG. 3 and FIG. 7, further illustrating the secondary game award calculation.

FIG. 8 is a screenshot of the example wagering game 300, in which the additional prize symbol 704 is populated in the FREE bingo position 608, and a secondary game award of 90K in an award banner 802.

In addition to the features described above, in at least some embodiments, symbols other than prize symbols may be replicated or populated from reels 306-314 to bingo card 302. For example, in at least one embodiment, jackpot symbols corresponding to one or more jackpots available to be awarded, such as jackpots 320, 322, 324, 326, and 328 may also be populated from reels 306-314 onto bingo card 302.

In various embodiments, a player may be awarded one or more jackpots 320-328 if a jackpot symbol populates from reels 306-314 into a predefined winning pattern, as described above. In such an embodiment, the secondary game award may be aggregated and calculated as described, except that the bingo position populated by a jackpot symbol may not contribute directly to the aggregate secondary game award. Rather, the bingo position populated by the jackpot symbol may cause the associated jackpot 320-328 to be awarded to the player.

In another embodiment, anytime a jackpot symbol is populated from reels 306-314 onto any bingo position of bingo card 302, the associated jackpot 320-328 may be awarded, or the associated jackpot 320-328 may be awarded when a predefined winning pattern is achieved on bingo card 302, with or without the addition of the jackpot symbol to the winning pattern (e.g., jackpot symbols anywhere on bingo card 302 may trigger jackpot awards once a predefined winning pattern is completed).

In another embodiment, after the completion of a bingo pattern on the bingo matrix, the value symbols that comprise that particular bingo pattern are removed for a subsequent play while all other value symbols are retained. In another embodiment, all value symbols in the bingo matrix are removed after one or more bingo patterns have been formed. In another embodiment, the value symbols that are removed are randomly determined. In some embodiments, the value symbols are that are removed are based on the player wager amount.

In some embodiments, wagering game 300 may be participated in and played by a plurality of players from a plurality of network-connected EGMs 104A-104X. In this embodiment, a bingo card, such as bingo card 302, may be shared between or common to each player, in that each player sees the same bingo card and contributes symbols, like prize symbols and jackpot symbols, to the same bingo card. Players may play at different speeds and using different wager amounts. However, because the bingo card is shared between the players, when a symbol is added to the bingo card as a result of a symbol appearing on the reels 306-314 of one player's EGM 104A-104X, all of the players participating in wagering game 300 may see the symbol populated on the shared bingo card. In addition, when a predefined winning pattern is achieved, each player may receive a percentage of the total aggregated secondary game award and/or jackpot, as described above, or each player may receive a value of the prize symbol(s) and/or jackpot symbol(s) added to the bingo card as a result of that player's particular gameplay.

Figure 9:
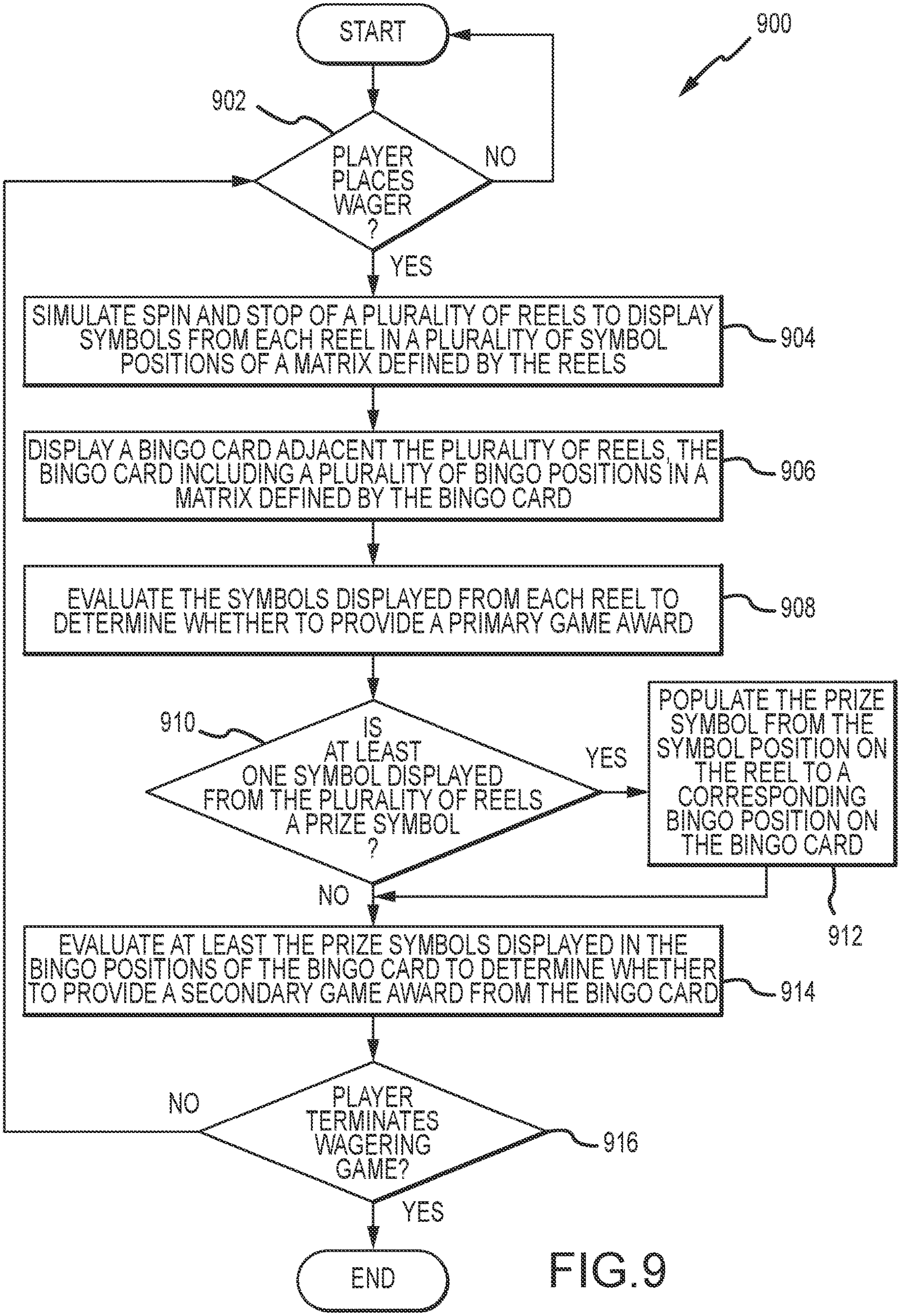
FIG. 9 is a flowchart illustrating a process for playing the wagering game of FIG. 3.

FIG. 9 is a flowchart illustrating and summarizing a process 900 for playing wagering game 300. Accordingly, in the example embodiment, wagering game 300 may be initiated in response to a player placing a wager, such as, for example, using a "Spin" or "Max Bet" button, as described herein (step 902). Further, in response to a player wager, reels 306-314 may be simulated to spin and stop, whereby symbols from each reel may be displayed in a plurality of symbol positions of a matrix defined by reels 306-314 (step 904).

In addition to simulating the spin and stop of reels 306-314, a bingo card, such as bingo card 302, may be displayed adjacent or in proximity to reels 306-314, where the bingo card 302 includes a plurality of bingo positions that together define a matrix of bingo positions (step 906). As described herein, each bingo position may correspond to one or more symbol positions of reels 306-314. In the example embodiment, the number of symbol positions in the matrix of symbol positions is equal to the number of bingo positions in the matrix of bingo positions, and there is a one-to-one correspondence between bingo positions and symbol positions.

Moreover, after simulating the spin and stop of reels 306-314, the symbols displayed from each reel 306-314 may be evaluated to determine whether to provide a primary game award (or primary game awards) (step 908). As described herein, one or more combinations of symbols appearing on reels 306-314 may be compared to a paytable to determine whether to provide one or more primary game awards.

In the example embodiment, if at least one symbol displayed from reels 306-314 is a prize symbol (or, in at least some embodiments, a jackpot symbol), the prize symbol (or jackpot symbol) may be replicated or populated from a symbol position of reels 306-314 to a corresponding bingo position of bingo card 302 (steps 910 and 912). Similarly, if multiple prize symbols (or jackpot symbols) are displayed from reels 306-314 after spinning and stopping reels 306-314, all or a subset of the prize and/or jackpot symbols may be populated from reel positions of reels 306-314 to corresponding bingo positions of bingo card 302.

After each spin of reels 306-314, bingo card 302 may be evaluated to determine whether to provide a secondary game award (or awards) (step 914). For example, as described above, the prize symbols displayed on bingo card 302 may be evaluated to determine whether one or more predefined winning patterns are formed by the prize symbols. If so, a one or more secondary awards may be provided. Likewise, if one or more jackpot symbols are included in the one or more predefined winning patterns (or in some embodiments, even if the jackpot symbols are not included in any winning pattern), one or more jackpots 320-328 may be provided. Finally, a player may decide whether he or she wishes to terminate wagering game 300 and/or continue gameplay by placing one or more additional wagers (steps 916 and 902).

Systems and methods for playing a wagering game in which symbols (e.g., prize symbols or jackpot symbols) are replicated or populated from symbol positions of one or more reels to corresponding bingo positions of an adjacent bingo card 302 are therefore described. In at least one embodiment, if a prize symbol, such as a symbol including a prize value, is displayed from the plurality of reels 304 after spinning and stopping the plurality of reels 304, the prize symbol may be replicated or populated from the symbol position on the reels to the corresponding bingo position on the bingo card.

After each spin of the reels 304, the bingo card 302 may be evaluated to determine whether the prize symbols populated thereon form any predefined winning patterns (e.g., diagonal patterns, straight line patterns, shaped patterns, and the like). If predefined winning patterns are formed on the bingo card from the prize symbols, a secondary game award, such as an aggregate award determined by adding the values of each prize symbol in the pattern, may be provided to a player of the wagering game.

In certain embodiments, bingo card 302 is not displayed separately in a separate area in FIGS. 3-8. Rather, any prize symbols 316 that appear on reels 304 in game outcomes are held in the matrix of reel positions on the reels 304 for subsequent plays of the game. As such, if predefined winning patterns are formed in the reel window of reels 304 from the prize symbols, a secondary game award, such as an aggregate award determined by adding the values of each prize symbol in the pattern, may be provided to a player of the wagering game, and may subsequently clear all of the prize symbols 316 from the reel window. In some of these embodiments, the prize symbols that are held in place can be used to form an outcome of a play of a game. In some embodiments, the prize symbols that are held in place cannot be used to form an outcome of a play of a game.

In certain embodiments, multiple bingo cards, such as bingo card 302, may be displayed adjacent or in proximity to reels 306-314. Further, there may be different type of prize symbols that are displayed at symbol positions on reels 306-314, each type of prize symbol corresponding to one of the multiple bingo cards. For example, there may be three bingo card displayed, a red bingo card, a blue bingo card, and a gold bingo card. Further, there may be three types of prize symbols (e.g., red prize symbols, blue prize symbols, and gold prize symbols). When a red prize symbol is displayed on reels 306-314, it may be replicated to the red bingo card. When a blue prize symbol is displayed on reels 306-314, it may be replicated to the blue bingo card. When a gold prize symbol is displayed on reels 306-314, it may be replicated to the gold bingo card. Each type of prize symbols and bingo cards may correspond to a different range of prizes, including the jackpots.

While the invention has been described with respect to the figures, it will be appreciated that many modifications and changes may be made by those skilled in the art without departing from the spirit of the invention. Any variation and derivation from the above description and figures are included in the scope of the present invention as defined by the claims.

What is claimed is:

1. An electronic gaming device comprising:
- at least one memory with instructions stored thereon; and
- at least one processor in communication with the at least one memory, wherein the instructions, when executed by the at least one processor, cause the at least one processor to:
  - cause display of a plurality of reels for an electronic game, wherein the plurality of reels are displayed in a first display area including a plurality of symbol positions;
  - receive a first input of a first input amount for the electronic game;
  - cause display of a first bingo card for the electronic game in a second display area, wherein the first bingo card includes a plurality of bingo positions and is associated with the first input amount;
  - cause display of a plurality of symbols at the plurality of symbol positions, wherein the plurality of symbols is associated with a game outcome for the electronic game;
  - based on the plurality of symbols including a prize symbol at a symbol position of the plurality of symbol positions, cause display of an animation of the prize symbol being displayed at a bingo position of the plurality of bingo positions that corresponds to the symbol position to provide a visual cue that the prize symbol is being displayed at the bingo position based on the prize symbol being displayed at the symbol position;
  - cause the prize symbol being at the bingo position of the plurality of bingo positions to be stored as being associated with the first input amount;
  - receive a second input of a second input amount for the electronic game; and
  - cause display of a second bingo card for the electronic game in the second display area, wherein the second bingo card includes the plurality of bingo positions and is associated with the second input amount.

2. The electronic gaming device of claim 1, wherein the instructions further cause the at least one processor to cause the prize symbol being at the bingo position of the plurality of bingo positions to be stored as being associated with the first input amount in at least one of the at least one memory or a server in communication with the electronic gaming device.

3. The electronic gaming device of claim 1, wherein the instructions further cause the at least one processor to, based on the second input amount, retrieve the second bingo card from at least one of the at least one memory or a server in communication with the electronic gaming device.

4. The electronic gaming device of claim 1, wherein the instructions further cause the at least one processor to:
- receive a third input of the first input amount for the electronic game; and
- cause display of the first bingo card for the electronic game in the second display area, wherein the first bingo card includes the prize symbol at the bingo position.

5. The electronic gaming device of claim 1, wherein at least one of the first bingo card or the second bingo card is stored in a server as being associated with a player account such that, upon play of the electronic game at a second electronic gaming device different from the electronic gaming device, the at least one of the first bingo card or the second bingo card is provided to the second electronic gaming device such that the at least one of the first bingo card or the second bingo card is persistent across different gaming sessions associated with the player account.

6. The electronic gaming device of claim 1, wherein the instructions further cause the at least one processor to provide an output amount based on a bingo pattern of a plurality of bingo patterns being achieved on the first bingo card by the prize symbol at the bingo position and at least one other prize symbol at at least one other bingo position of the plurality of bingo positions.

7. The electronic gaming device of claim 1, wherein the instructions further cause the at least one processor to cause display of the plurality of symbols associated with the game outcome based on a message associated with the game outcome received from a server.

8. The electronic gaming device of claim 1, wherein the animation is displayed between the bingo position and the symbol position and comprises at least one of a ray or a beam of light.

9. An electronic gaming system comprising:
- at least one memory with instructions stored thereon; and
- at least one processor in communication with the at least one memory, wherein the instructions, when executed by the at least one processor, cause the at least one processor to:
  - receive a first input of a first input amount for an electronic game at an electronic gaming device, wherein the electronic game includes a plurality of reels in a first display area including a plurality of symbol positions;
  - cause a first bingo card for the electronic game to be provided in a second display area, wherein the first bingo card includes a plurality of bingo positions and is associated with the first input amount;
  - cause a plurality of symbols to be provided at the plurality of symbol positions, wherein the plurality of symbols is associated with a game outcome for the electronic game;
  - based on the plurality of symbols including a prize symbol at a symbol position of the plurality of symbol positions, cause an animation of the prize symbol to be provided at a bingo position of the plurality of bingo positions that corresponds to the symbol position to provide a visual cue that the prize symbol is being displayed at the bingo position based on the prize symbol being displayed at the symbol position;
  - cause the prize symbol being at the bingo position of the plurality of bingo positions to be stored as being associated with the first input amount;
  - receive a second input of a second input amount for the electronic game; and
  - cause a second bingo card for the electronic game to be provided in the second display area, wherein the second bingo card includes the plurality of bingo positions and is associated with the second input amount.

10. The electronic gaming system of claim 9, wherein the instructions further cause the at least one processor to cause the prize symbol being at the bingo position of the plurality of bingo positions to be stored as being associated with the first input amount in the at least one memory.

11. The electronic gaming system of claim 9, wherein the instructions further cause the at least one processor to, based on the second input amount, retrieve the second bingo card from the at least one memory.

12. The electronic gaming system of claim 9, wherein the instructions further cause the at least one processor to:
- receive a third input of the first input amount for the electronic game; and
- cause the first bingo card to be provided in the second display area, wherein the first bingo card includes the prize symbol at the bingo position.

13. The electronic gaming system of claim 9, wherein at least one of the first bingo card or the second bingo card is stored in the at least one memory as being associated with a player account such that, upon play of the electronic game at a second electronic gaming device different from the electronic gaming device, the at least one of the first bingo card or the second bingo card is provided to the second electronic gaming device such that the at least one of the first bingo card or the second bingo card is persistent across different gaming sessions associated with the player account.

14. The electronic gaming system of claim 9, wherein the instructions further cause the at least one processor to cause an output amount to be provided based on a bingo pattern of a plurality of bingo patterns being achieved on the first bingo card by the prize symbol at the bingo position and at least one other prize symbol at at least one other bingo position of the plurality of bingo positions.

15. The electronic gaming system of claim 9, wherein the instructions further cause the at least one processor to cause the plurality of symbols associated with the game outcome to be provided by transmitting a message associated with the game outcome to the electronic gaming device.

16. A method of electronic gaming implemented by at least one processor in communication with at least one memory, the method comprising:
- causing a plurality of reels to be displayed for an electronic game at an electronic gaming device, wherein the plurality of reels are displayed in a first display area include a plurality of symbol positions;
- receiving a first input of a first input amount for the electronic game;
- causing a first bingo card to be displayed for the electronic game in a second display area, wherein the first bingo card includes a plurality of bingo positions and is associated with the first input amount;

causing a plurality of symbols to be displayed at the plurality of symbol positions, wherein the plurality of symbols is associated with a game outcome for the electronic game;

in response to the plurality of symbols including a prize symbol at a symbol position of the plurality of symbol positions, causing an animation of the prize symbol to be displayed at a bingo position of the plurality of bingo positions that corresponds to the symbol position to provide a visual cue that the prize symbol is being displayed at the bingo position based on the prize symbol being displayed at the symbol position;

causing the prize symbol being at the bingo position of the plurality of bingo positions to be stored as being associated with the first input amount;

receiving a second input of a second input amount for the electronic game; and causing a second bingo card to be displayed for the electronic game in the second display area, wherein the second bingo card includes the plurality of bingo positions and is associated with the second input amount.

17. The method of claim 16, further comprising, in response to the second input amount being received, retrieving the second bingo card from at least one of the at least one memory or a server in communication with the electronic gaming device.

18. The method of claim 16, further comprising:

receiving a third input of the first input amount for the electronic game; and causing the first bingo card to be displayed for the electronic game in the second display area, wherein the first bingo card includes the prize symbol at the bingo position.

19. The method of claim 16, wherein at least one of the first bingo card or the second bingo card is stored in a server as being associated with a player account such that, upon play of the electronic game at a second electronic gaming device different from the electronic gaming device, the at least one of the first bingo card or the second bingo card is provided to the second electronic gaming device such that the at least one of the first bingo card or the second bingo card is persistent across different gaming sessions associated with the player account.

20. The method of claim 16, further comprising causing the plurality of symbols associated with the game outcome to be displayed based on at least one message associated with the game outcome received from a server.

* * * * *